United States Patent
Liu et al.

(10) Patent No.: US 11,057,376 B2
(45) Date of Patent: *Jul. 6, 2021

(54) METHOD, APPARATUS, AND SYSTEM FOR CONTROLLING INTELLIGENT DEVICE, AND STORAGE MEDIUM

(71) Applicant: TENCENT TECHNOLOGY (SHENZHEN) COMPANY LIMITED, Guangdong (CN)

(72) Inventors: Wenqing Liu, Guangdong (CN); Zixi Shen, Guangdong (CN); Qiang Wang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 47 days.

This patent is subject to a terminal disclaimer.

(21) Appl. No.: 16/720,197

(22) Filed: Dec. 19, 2019

(65) Prior Publication Data

US 2020/0128003 A1 Apr. 23, 2020

Related U.S. Application Data

(63) Continuation of application No. 15/771,177, filed as application No. PCT/CN2016/105292 on Nov. 10, 2016, now Pat. No. 10,547,609.

(30) Foreign Application Priority Data

Apr. 27, 2016 (CN) .......................... 201610272026.0

(51) Int. Cl.
*H04L 29/06* (2006.01)
*H04L 9/32* (2006.01)
(Continued)

(52) U.S. Cl.
CPC ........ *H04L 63/0853* (2013.01); *G05B 19/042* (2013.01); *H04L 9/30* (2013.01);
(Continued)

(58) Field of Classification Search
CPC ....... H04L 63/0853; H04L 9/32; H04L 63/10; H04L 9/3247; H04L 9/30; H04L 9/3263;
(Continued)

(56) References Cited

U.S. PATENT DOCUMENTS 8,316,237 B1 * 11/2012 Felsher ................. H04L 9/0825
713/171
9,998,440 B2 * 6/2018 Yan .......................... H04L 63/08
(Continued)

FOREIGN PATENT DOCUMENTS

CN 104200632 A 12/2014
CN 104240077 A 12/2014
(Continued)

OTHER PUBLICATIONS

Communication dated Jan. 10, 2020 from the Korean Intellectual Property Office in Application No. 10-2018-7023924.
(Continued)

*Primary Examiner* — Badri Narayanan Champakesan
(74) *Attorney, Agent, or Firm* — Sughrue Mion, PLLC

(57) ABSTRACT

A method, an apparatus, and a system for controlling an intelligent device are provided. The device transmits a control request including a first intelligent device identifier corresponding to a first intelligent device to be controlled. In response to transmitting the control request, the device receives a first verification character string that corresponds to the control request. The first verification character string is transmitted to a first wearable device locally establishing a data connection with the first wearable device. First signed information is received from the first wearable device. The
(Continued)

first signed information is a result of performing a signature on first to-be-signed information and includes the first verification character string. The first signed information and operation information for controlling the first intelligent device are transmitted.

18 Claims, 15 Drawing Sheets

(51) Int. Cl.
*H04W 4/80* (2018.01)
*G05B 19/042* (2006.01)
*H04W 12/47* (2021.01)
*H04W 12/06* (2021.01)
*H04W 12/069* (2021.01)
*H04L 9/30* (2006.01)

(52) U.S. Cl.
CPC .......... *H04L 9/3247* (2013.01); *H04L 9/3263* (2013.01); *H04L 63/10* (2013.01); *H04W 4/80* (2018.02); *H04W 12/068* (2021.01); *H04W 12/069* (2021.01); *H04W 12/47* (2021.01); *G05B 2219/24161* (2013.01); *G05B 2219/25428* (2013.01); *G05B 2219/2642* (2013.01); *H04L 2209/805* (2013.01); *Y02P 90/02* (2015.11)

(58) Field of Classification Search
CPC ............ H04L 2209/805; H04W 12/06; H04W 12/00407; H04W 4/80; Y02P 90/02; G05B 19/418; G05B 15/02; G05B 19/042; G05B 2219/2642; G05B 2219/25428; G05B 2219/24161
USPC ........................................................ 726/5
See application file for complete search history.

(56) References Cited

U.S. PATENT DOCUMENTS

| | | | | |
|---|---|---|---|---|
| 10,114,939 | B1* | 10/2018 | Bhalerao | H04W 12/069 |
| 2005/0071879 | A1* | 3/2005 | Haldavnekar | G08B 13/19684 |
| | | | | 725/81 |
| 2005/0154898 | A1* | 7/2005 | Chao | H04L 9/3247 |
| | | | | 713/185 |
| 2005/0195975 | A1* | 9/2005 | Kawakita | H04L 9/0825 |
| | | | | 380/30 |
| 2005/0250474 | A1* | 11/2005 | Hong | H04W 60/04 |
| | | | | 455/411 |
| 2013/0198519 | A1* | 8/2013 | Marien | G06F 21/34 |
| | | | | 713/172 |
| 2014/0090034 | A1* | 3/2014 | Fyke | H04L 63/061 |
| | | | | 726/5 |
| 2014/0222215 | A1* | 8/2014 | Nishiyama | H05B 47/195 |
| | | | | 700/275 |
| 2014/0329497 | A1* | 11/2014 | Sanzgiri | H04L 63/0861 |
| | | | | 455/411 |
| 2015/0074760 | A1* | 3/2015 | Yan | H04W 12/06 |
| | | | | 726/3 |
| 2015/0089624 | A1* | 3/2015 | Kim | H04W 12/06 |
| | | | | 726/9 |
| 2015/0350164 | A1* | 12/2015 | Lu | H04L 63/04 |
| | | | | 713/173 |
| 2016/0063783 | A1* | 3/2016 | Bruns | G07C 9/00571 |
| | | | | 340/5.61 |
| 2016/0253710 | A1* | 9/2016 | Publicover | H04N 21/4532 |
| | | | | 705/14.66 |
| 2020/0079320 | A1* | 3/2020 | Lacoss-Arnold | |
| | | | | B60R 25/2081 |
| 2020/0372992 | A1* | 11/2020 | Wu | G16Y 10/60 |

FOREIGN PATENT DOCUMENTS

| | | |
|---|---|---|
| CN | 104883686 A | 9/2015 |
| CN | 105093948 A | 11/2015 |
| CN | 105227516 A | 1/2016 |
| CN | 105429960 A | 3/2016 |
| CN | 105487491 A | 4/2016 |
| CN | 105974802 A | 9/2016 |
| KR | 10-1363115 B1 | 2/2014 |
| KR | 10-2015-0087085 A | 7/2015 |
| WO | 2012/131074 A1 | 10/2012 |
| WO | 2015/180261 A1 | 12/2015 |

OTHER PUBLICATIONS

Chinese Office Action for corresponding 201610272026.0 dated Apr. 7, 2017.
International Search Report for PCT/CN2016/105292, dated Feb. 8, 2017.
Communication dated Jun. 5, 2020, issued by the Intellectual Property Office of India in application No. 201817024121.

* cited by examiner

METHOD, APPARATUS, AND SYSTEM FOR CONTROLLING INTELLIGENT DEVICE, AND STORAGE MEDIUM

CROSS REFERENCE TO RELATED APPLICATIONS

This application is a continuation of U.S. application Ser. No. 15/771,177 filed on Apr. 26, 2018, which is a National Stage of International Application No. PCT/CN2016/105292 filed Nov. 10, 2016, claiming priority based on Chinese Patent Application No. 201610272026.0 filed Apr. 27, 2016, the entirety contents of each of which are herein incorporated by reference.

FIELD OF THE TECHNOLOGY

The present disclosure relates to the field of computer technologies, and in particular, to a method, an apparatus, and a system for controlling an intelligent device, and a storage medium.

BACKGROUND OF THE DISCLOSURE

With fast development of computer technologies, intelligent devices gradually enter the life of people, and a user may use a terminal to control an intelligent device in the home by using a network, such as an intelligent refrigerator or an intelligent microwave oven.

An administration account and a password that are used for administration are usually configured for each intelligent device. When a user needs to control an intelligent device by using a terminal, the user needs to start a device control program in the terminal, select the intelligent device, and input an administration account and a password that correspond to the intelligent device. The terminal may send an intelligent device identifier, the administration account, and the password to a server, and then the server may determine the corresponding intelligent device according to the intelligent device identifier, and determine whether the administration account and the password that are sent by the terminal match an administration account and a password that correspond to the intelligent device and that are stored in advance. If matching, the server allows the user to control the intelligent device by using the terminal.

In the foregoing process of controlling an intelligent device, if a hacker obtains the administration account and the password that are input by the user, the hacker may easily control the intelligent device in the home of the user. As a result, security of controlling an intelligent device is relatively poor.

SUMMARY

It is an aspect to provide a method, an apparatus, a system, and a storage medium for controlling an intelligent device in which security of the controlling the intelligent device is increased. The technical solutions are as follows:

According to a first aspect of one or more exemplary embodiments, there is provided a method for controlling an intelligent device is provided, including:

sending a control request corresponding to a first intelligent device to a server, the control request carrying a first intelligent device identifier;

receiving a first verification character string that corresponds to the control request and that is sent by the server;

sending the first verification character string to a first wearable device locally establishing a data connection;

receiving first signed information that is obtained by performing signature on first to-be-signed information and that is sent by the first wearable device, the first to-be-signed information including at least the first verification character string; and sending, to the server, the first signed information and operation information for the first intelligent device that is input by a user.

According to a second aspect of one or more exemplary embodiments, there is provided a method for controlling an intelligent device is provided, including:

receiving a control request that corresponds to a first intelligent device and that is sent by a first terminal device, the control request carrying a first intelligent device identifier;

sending a verification request to the first intelligent device corresponding to the first intelligent device identifier;

receiving a first verification character string sent by the first intelligent device, and sending the first verification character string to the first terminal device; and receiving first signed information and operation information for the first intelligent device that are sent by the first terminal device, the first signed information being obtained by performing signature on first to-be-signed information, and sending the first signed information and the operation information to the first intelligent device, the first to-be-signed information including at least the first verification character string.

According to a third aspect of one or more exemplary embodiments, there is provided a method for controlling an intelligent device is provided, including:

receiving a verification request sent by a server;

sending a first verification character string to the server;

receiving first signed information and operation information that are sent by the server, the first signed information being obtained by performing signature on first to-be-signed information, and performing signature verification on the first signed information according to a locally pre-stored public key, the first to-be-signed information including at least the first verification character string; and performing corresponding operation processing according to the operation information if the signature verification succeeds.

According to a fourth aspect of one or more exemplary embodiments, there is provided a method for controlling an intelligent device is provided, including:

receiving a first verification character string sent by a first terminal device;

performing signature on first to-be-signed information according to a locally pre-stored private key, the first to-be-signed information including at least the first verification character string; and sending first signed information that is obtained by performing signature on the first to-be-signed information to the first terminal device.

According to a fifth aspect of one or more exemplary embodiments, there is provided a first terminal device is provided, including:

a first sending module, configured to send a control request corresponding to a first intelligent device to a server, the control request carrying a first intelligent device identifier;

a first receiving module, configured to receive a first verification character string that corresponds to the control request and that is sent by the server;

a second sending module, configured to send the first verification character string to a first wearable device locally establishing a data connection;

a second receiving module, configured to receive first signed information that is obtained by performing signature on first to-be-signed information and that is sent by the first wearable device, the first to-be-signed information including at least the first verification character string; and a third sending module, configured to send, to the server, the first signed information and operation information for the first intelligent device that is input by a user.

According to a sixth aspect of one or more exemplary embodiments, there is provided a server is provided, including:

a first receiving module, configured to receive a control request that corresponds to a first intelligent device and that is sent by a first terminal device, the control request carrying a first intelligent device identifier;

a first sending module, configured to send a verification request to the first intelligent device corresponding to the first intelligent device identifier;

a second receiving module, configured to receive a first verification character string sent by the first intelligent device, and send the first verification character string to the first terminal device; and a second sending module, configured to receive first signed information and operation information for the first intelligent device that are sent by the first terminal device, the first signed information being obtained by performing signature on first to-be-signed information, and send the first signed information and the operation information to the first intelligent device, the first to-be-signed information including at least the first verification character string.

According to a seventh aspect of one or more exemplary embodiments, there is provided a first intelligent device is provided, including:

a first receiving module, configured to receive a verification request sent by a server;

a first sending module, configured to send a first verification character string to the server;

a first signature verification module, configured to receive first signed information and operation information that are sent by the server, the first signed information being obtained by performing signature on first to-be-signed information, and perform signature verification on the first signed information according to a locally pre-stored public key, the first to-be-signed information including at least the first verification character string; and a processing module, configured to perform corresponding operation processing according to the operation information if the signature verification succeeds.

According to an eighth aspect of one or more exemplary embodiments, there is provided a first wearable device is provided, including:

a first receiving module, configured to receive a first verification character string sent by a first terminal device;

a first signature module, configured to perform signature on first to-be-signed information according to a locally pre-stored private key, the first to-be-signed information including at least the first verification character string; and a first sending module, configured to send first signed information that is obtained by performing signature on the first to-be-signed information to the first terminal device.

According to a ninth aspect of one or more exemplary embodiments, there is provided a system for controlling an intelligent device is provided, including: a first terminal device, a server, a first intelligent device, and a first wearable device, the first terminal device being configured to send a control request corresponding to the first intelligent device to the server, the control request carrying a first intelligent device identifier; receive a first verification character string that corresponds to the control request and that is sent by the server; send the first verification character string to the first wearable device locally establishing a data connection; receive first signed information that is obtained by performing signature on first to-be-signed information and that is sent by the first wearable device, the first to-be-signed information including at least the first verification character string; and send, to the server, the first signed information and operation information for the first intelligent device that is input by a user;

the server being configured to receive the control request that corresponds to the first intelligent device and that is sent by the first terminal device; send a verification request to the first intelligent device corresponding to the first intelligent device identifier; receive the first verification character string sent by the first intelligent device, and send the first verification character string to the first terminal device; and receive the first signed information and the operation information for the first intelligent device that are sent by the first terminal device, the first signed information being obtained by performing signature on the first to-be-signed information, and send the first signed information and the operation information to the first intelligent device;

the first intelligent device being configured to receive the verification request sent by the server; send the first verification character string to the server; receive the first signed information and the operation information that are sent by the server, the first signed information being obtained by performing signature on the first to-be-signed information, and perform signature verification on the first signed information according to a locally pre-stored public key; and perform corresponding operation processing according to the operation information if the signature verification succeeds; and the first wearable device is configured to receive the first verification character string sent by the first terminal device; perform signature on the first to-be-signed information according to a locally pre-stored private key; and send the first signed information that is obtained by performing signature on the first to-be-signed information to the first terminal device.

According to a tenth aspect of one or more exemplary embodiments, there is provided a computer storage medium is provided, computer executable instructions being stored in the computer storage medium, and the computer executable instructions being used to perform at least one of the foregoing methods.

In the exemplary embodiments, a first terminal device sends a control request corresponding to a first intelligent device to a server, the control request carrying a first intelligent device identifier; receives a first verification character string that corresponds to the control request and that is sent by the server; sends the first verification character string to a first wearable device locally establishing a data connection; receives first signed information that is obtained by performing signature on first to-be-signed information and that is sent by the first wearable device, the first to-be-signed information including at least the first verification character string; and sends, to the server, the first signed information and operation information for the first intelligent device that is input by a user. In a process of controlling an intelligent device, a wearable device is used to perform authorization. In this way, even if a hacker steals an administration account and a password of the intelligent device, the intelligent device cannot be controlled without the corresponding wearable device. Therefore, the security of controlling the intelligent device may be enhanced.

DESCRIPTION OF EXEMPLARY EMBODIMENTS

To make the objectives, technical solutions, and advantages of the present disclosure clearer, the following further describes implementations of the present disclosure in detail with reference to the accompanying drawings. It should be understood that, the exemplary embodiments described below are merely used for describing and explaining the present disclosure, but not used for limiting the present disclosure.

Figure 1:
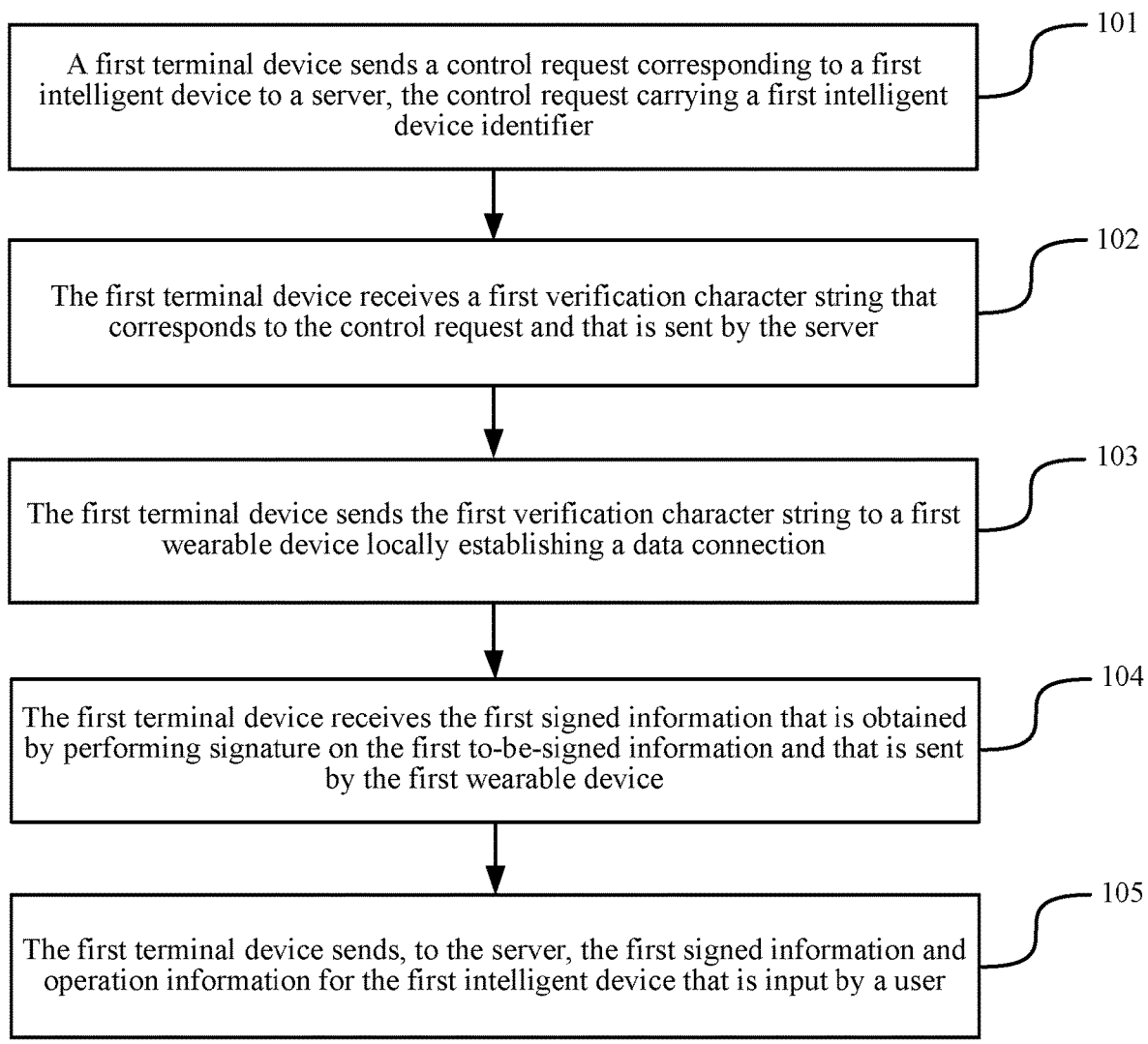
FIG. 1 is a flowchart of a method for controlling an intelligent device according to an exemplary embodiment.

An exemplary embodiment provides a method for controlling an intelligent device, and the method may be implemented by functions of a wearable device, an intelligent device, a terminal device, and a server, and may be cooperatively implemented by a routing device. As shown in FIG. 1, in the method, a processing procedure of a first wearable device may include the following steps:

Step 101. A first terminal device sends a control request corresponding to a first intelligent device to a server, the control request carrying a first intelligent device identifier.

Step 102. The first terminal device receives a first verification character string that corresponds to the control request and that is sent by the server.

Step 103. The first terminal device sends the first verification character string to a first wearable device locally establishing a data connection.

Step 104. The first terminal device receives first signed information that is obtained by performing signature on first to-be-signed information and that is sent by the first wearable device, the first to-be-signed information including at least the first verification character string.

Step 105. The first terminal device sends, to the server, the first signed information and operation information for the first intelligent device that is input by a user.

In this exemplary embodiment, a first terminal device sends a control request corresponding to a first intelligent device to a server, the control request carrying a first intelligent device identifier; receives a first verification character string that corresponds to the control request and that is sent by the server; sends the first verification character string to a first wearable device locally establishing a data connection; receives first signed information that is obtained by performing signature on first to-be-signed information and that is sent by the first wearable device, the first to-be-signed information including at least the first verification character string; and sends, to the server, the first signed information and operation information for the first intelligent device that is input by a user. In a process of controlling an intelligent device, a wearable device is used to perform authorization. In this way, even if a hacker steals an administration account and a password of the intelligent device, the intelligent device cannot be controlled without the corresponding wearable device. Therefore, security of controlling the intelligent device may be enhanced.

In this exemplary embodiment, the first terminal device and the first wearable device in step 103 may be devices connected to a same local area network. For example, the first terminal device and the first wearable device may be located in a same WiFi local area network. For another example, the first wearable device may be further a device, between which and the first terminal device a direct connection is established, and a Bluetooth direct connection, a device to device D2D direct connection or a WiFi direct connection is established between the first wearable device and the first terminal device. In this way, the first wearable device and the first terminal device are two devices, between which a data connection is locally established.

An exemplary embodiment provides a method for controlling an intelligent device, and the method may be implemented by functions of a wearable device, an intelligent device, a terminal device, and a server, and may be cooperatively implemented by a routing device.

The wearable device may be a wearable device having a key generating function, such as a smart band, a smart pen, or a Bluetooth headset. The wearable device may include a short range communications component, configured to perform information exchange with another device, the short range communications component may be a near field communication (NFC) communications component or a Bluetooth communications component, the wearable device may include an input unit, such as a key or a touch screen, and a user may perform, on the wearable device by using the input unit, an input operation that may be related in a process of controlling an intelligent device. The wearable device may include a processor, and the processor may be configured to be responsible for processing performed by the wearable device in the process of controlling an intelligent device. The wearable device may further include a memory, and the memory may be configured to record data generated by the wearable device in the process of controlling an intelligent device and data that is sent from another device and that is received by the wearable device. The wearable device may further include components such as a sensor, an output unit, and a power supply.

The intelligent device may be an intelligent refrigerator, an intelligent television, an intelligent microwave oven, or the like. The intelligent device may include a communications component, configured to be responsible for data transmission in the process of controlling an intelligent device, and the communications component may be a Bluetooth component, a WiFi (Wireless-Fidelity) component, an antenna, or the like. The intelligent device may further include a short range communications component, configured to perform information exchange with another device. The short range communications component may be an NFC communications component or a Bluetooth communications component. The intelligent device may include an input unit, such as a key or a touch screen, and a user may perform, on the intelligent device by using the input unit, an input operation that may be related in the process of controlling an intelligent device. The intelligent device may include a processor, and the processor may be configured to be responsible for processing performed by the intelligent device in the process of controlling an intelligent device. The intelligent device may further include a memory, and the memory may be configured to record data generated by the intelligent device in the process of controlling an intelligent device and data that is sent from another device and that is received by the intelligent device. The intelligent device may further include components such as a sensor, an output unit, and a power supply.

The terminal device may be a mobile terminal such as a mobile phone or a tablet computer, or may be a fixed terminal such as a desktop computer. The terminal device may include a communications component, configured to be responsible for data transmission in the process of controlling an intelligent device, and the communications component may be a Bluetooth component, a WiFi (Wireless-Fidelity) component, an antenna, or the like. The terminal device may further include a short range communications component, configured to perform information exchange with another device, the short range communications component may be an NFC communications component or a Bluetooth communications component, and the terminal device may include an input unit, such as a key, a touch screen, or a mouse, and a user may perform, on the terminal device by using the input unit, an input operation in the process of controlling an intelligent device. The terminal device may include a processor, and the processor may be configured to be responsible for processing performed by the terminal device in the process of controlling an intelligent device. The terminal device may further include components such as a memory, a sensor, and a power supply.

The server may be a management server of the intelligent device, a processor, a memory, and a transceiver may be disposed in the server, the processor may be configured to be responsible for processing performed by the server in the process of controlling an intelligent device, the memory may be configured to store data required and generated in the following processing process, and the transceiver may be configured to receive and send data. The routing device may be a device configured to cause the intelligent device and the server to establish a data connection, such as a router. The router may be provided with a processor, a memory, and a transceiver, the processor may be configured to be responsible for processing performed by the server in the process of controlling an intelligent device, the memory may be configured to store data required and generated in the following processing process, and the transceiver may be configured to receive and send data. In this exemplary embodiment, using an example in which the terminal device is a mobile phone, the wearable device may be a smart band, the intelligent device may be an intelligent microwave oven, and the routing device may be a wireless router, a solution is described in detail. Other situations are similar thereto, and details are not described again in this exemplary embodiment.

Figure 2:
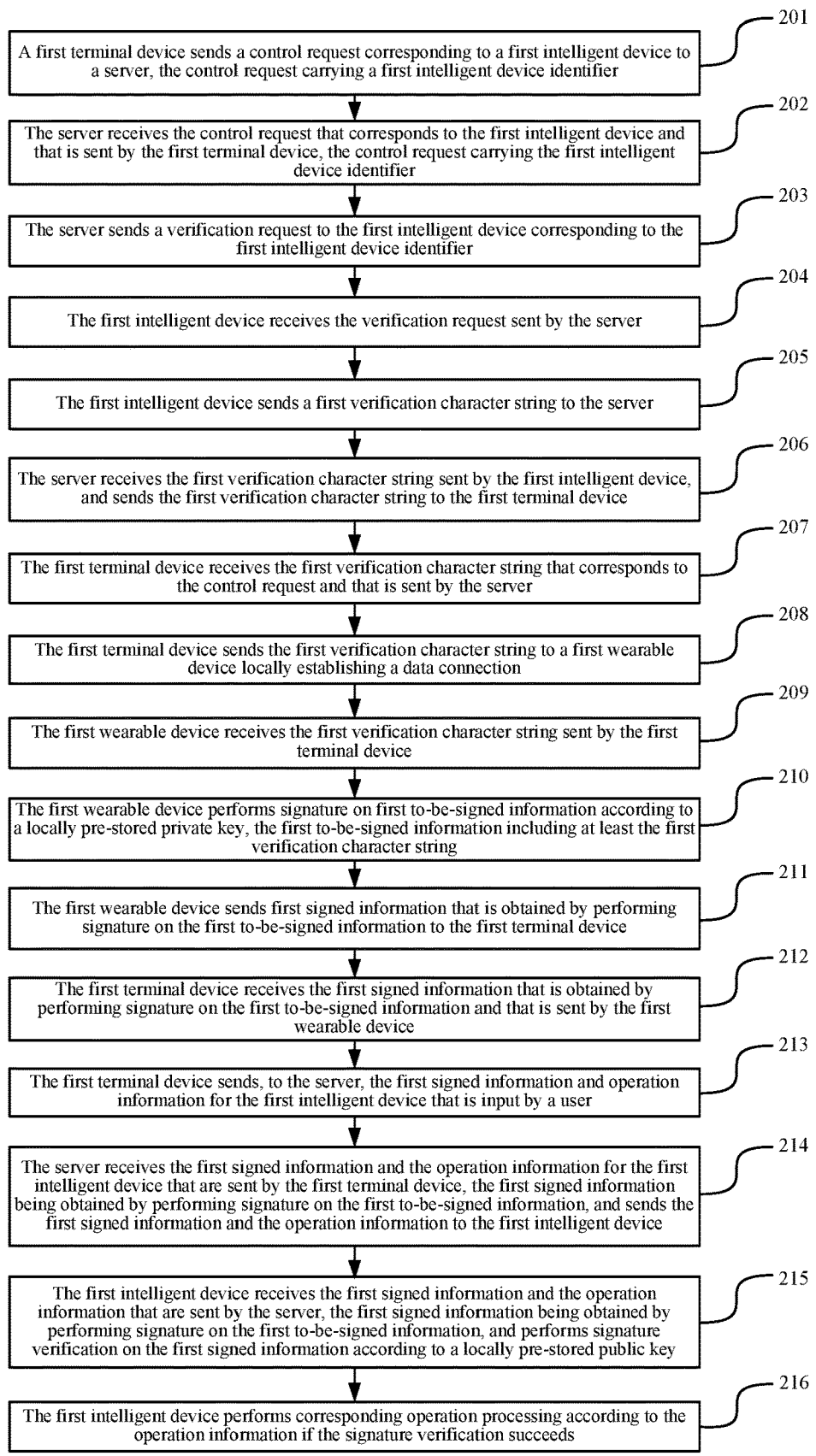
FIG. 2 is a flowchart of a method for controlling an intelligent device according to an exemplary embodiment.

The processing process shown in FIG. 2 is described in detail below with reference to specific implementations. Content may be as follows:

Step 201. A first terminal device sends a control request corresponding to a first intelligent device to a server, the control request carrying a first intelligent device identifier.

In an implementation, a control application program configured to control an intelligent device may be installed in the first terminal device, and a user may start the control application program. In this case, the first terminal device may display a main page of the control application program, the user may click a device selection key in the main page, and then the first terminal device may display an intelligent device identifier of the intelligent device bound to a first account currently logging in to the first terminal device. Therefore, the user may click the first intelligent device identifier of the first intelligent device to be controlled. Herein, if the first intelligent device that the user intends to control is not bound to the first account, the user may click to start a camera of the first terminal device, to scan a two-dimensional code of the first intelligent device. In this way, the first intelligent device may be bound to the first account. After the user clicks to select the first intelligent device identifier, the first terminal device may send the control request that carries the first intelligent device identifier and that corresponds to the first intelligent device to a server. It should be noted that, the server here is not the server corresponding to the foregoing control application program, but is an IoT server with which related information of the first intelligent device is registered (for a related registration process, refer to the following description). In a process in which the first terminal device communicates with the Internet of Things (IoT) server, transmitted information may be directly forwarded by the server corresponding to the foregoing control application program without performing any processing, and the first terminal device may also directly communicate with the Internet of Things server.

In some exemplary embodiments, if one intelligent device is bound to each of a plurality of wearable devices (for a related binding process, refer to the following description), the control request sent by the first terminal device to the server in step 201 further carries a first wearable device identifier.

In an implementation, if a binding relationship is established between the first intelligent device and each of a plurality of wearable devices, after clicking to select the first intelligent device identifier, the user may input a first wearable device identifier of a first wearable device, between which and the first intelligent device a binding relationship is established, and then the first terminal device may add the first wearable device identifier to the control request that corresponds to the first intelligent device and that is sent to the server.

Step 202. The server receives the control request that corresponds to the first intelligent device and that is sent by the first terminal device, the control request carrying the first intelligent device identifier.

In an implementation, after the first terminal device sends the control request of the first intelligent device to the server, the server may receive the corresponding control request, the control request carrying the first intelligent device identifier.

In some exemplary embodiments, based on processing in which the foregoing control request carries the first wearable device identifier, the control request here carries the first wearable device identifier.

Step 203. The server sends a verification request to the first intelligent device corresponding to the first intelligent device identifier.

In an implementation, after the server receives the control request corresponding to the first intelligent device, the first intelligent device may be determined according to the first intelligent device identifier. Therefore, the server may send a verification request to the first intelligent device, so as to verify whether the first terminal device is qualified to control the first intelligent device. It should be noted that, the first intelligent device has completed registration in the server, and logged in to the server. Therefore, the server may send a related message to the first intelligent device.

In some exemplary embodiments, based on processing in which the foregoing control request carries the first wearable device identifier, the verification request in step 203 further carries the first wearable device identifier.

Step 204. The first intelligent device receives the verification request sent by the server.

In an implementation, after the server sends the verification request to the first intelligent device, the first intelligent device may correspondingly receive the verification request.

In some exemplary embodiments, based on processing in which the foregoing verification request carries the first wearable device identifier, in step 204, the first intelligent device may further obtain the first wearable device identifier from the received verification request, and perform corresponding recording.

Step 205. The first intelligent device sends a first verification character string to the server.

In an implementation, after receiving the verification request sent by the server, the first intelligent device may send the first verification character string used for verification to the server. The first verification character string may be a provisionally generated random character string, or may be a fixed character string pre-stored in the first intelligent device.

In some exemplary embodiments, an intelligent device may be associated with a routing device. Correspondingly, processing of step 205 may be as follows: the first intelligent device sends, to the server, the first verification character string and a first routing device identifier of a first routing device locally establishing a communication connection.

In an implementation, considering that an intelligent device is a smart furniture, and usually, the smart furniture is disposed in a house. To ensure security, the smart furniture may be associated with a routing device in the house, that is, the intelligent device may record an associated routing device identifier. Specifically, the first intelligent device may record the first routing device identifier of the first routing device, between which and the first intelligent device a communication connection is established, and then may send the first routing device identifier while sending the first verification character string to the server. Further, considering that each character length of a Hash value is a regular length, Hash calculation may be performed on a combination of the first routing device identifier and the first intelligent device identifier, to obtain a first Hash value. In this way, in a subsequent step, processing of sending the first routing device identifier and/or the first intelligent device identifier may be replaced with sending the first Hash value.

Step 206. The server receives the first verification character string sent by the first intelligent device, and sends the first verification character string to the first terminal device.

In an implementation, after the first intelligent device sends the first verification character string to the server, the server may receive the corresponding first verification character string, and then may directly send the first verification character string to the first terminal device.

In some exemplary embodiments, based on a case in which an intelligent device is associated with a routing device, corresponding processing in step 206 may be as follows: the server receives the first verification character string and the first routing device identifier that are sent by the first intelligent device, and sends the first verification character string and the first routing device identifier to the first terminal device.

In an implementation, the server may receive the first routing device identifier sent by the first intelligent device while receiving the first verification character string, and then may send the first verification character string and the first routing device identifier together to the first terminal device.

Step 207. The first terminal device receives the first verification character string that corresponds to the control request and that is sent by the server.

In an implementation, after the server sends the first verification character string to the first terminal device, the first terminal device may receive the first verification character string of the control request sent in corresponding step 201. Here, a manner of making the first verification character string correspond to the control request may be: in inter-device communication in step 201 to step 207, any sent message may be attached with a communication identifier of the current communication, and the communication identifier may be generated by the control application program in the first terminal device, and is used to uniquely indicate an identifier of the current process of controlling an intelligent device.

In some exemplary embodiments, based on a case in which the server sends the first routing device identifier to the first terminal device, processing of step 207 may be as follows: receiving the first verification character string corresponding to the control request and the first routing device identifier that are sent by the server.

Step 208. The first terminal device sends the first verification character string to a first wearable device locally establishing a data connection.

The first wearable device may be a wearable device, between which and the foregoing first intelligent device a binding relationship is established (for a specific binding process, refer to the following description). The data connection between the first terminal device and the first wearable device may be a near field communication connection, such as Bluetooth, NFC, or local area WIFI.

In an implementation, after receiving the first verification character string that corresponds to the control request and that is sent by the server, the first terminal device may send the first verification character string to the first wearable device locally establishing the data connection.

In some exemplary embodiments, a binding relationship may be established between one wearable device and a plurality of intelligent devices, and correspondingly, processing of step 208 may be as follows: the first terminal device sends the first verification character string and the first intelligent device identifier to the first wearable device locally establishing the data connection.

In an implementation, after receiving the first verification character string that corresponds to the control request and that is sent by the server, the first terminal device may send the first verification character string to the first wearable device locally establishing the data connection, and meanwhile may send the first intelligent device identifier to the first wearable device.

In some exemplary embodiments, based on the foregoing case related to the first routing device, processing of step 208 may be as follows: the first terminal device sends the first verification character string, the first intelligent device identifier, and the first routing device identifier to the first wearable device locally establishing the data connection.

In some exemplary embodiments, signature may also be selected to be performed on operation information, and correspondingly, before step 208, the method may further include the following processing: obtaining operation information for the first intelligent device that is input by a user.

In an implementation, after the first terminal device receives the first verification character string, the user may input the operation information for the first intelligent device. In this way, the first terminal device may obtain the operation information input by the user.

In some exemplary embodiments, based on the foregoing processing of obtaining the operation information before step 208, processing corresponding to step 208 may be as follows: the first terminal device sends the first verification character string and the operation information to the first wearable device.

Step 209. The first wearable device receives the first verification character string sent by the first terminal device.

In an implementation, after the first terminal device sends the first verification character string to the first wearable device, the first wearable device may receive the corresponding first verification character string.

In some exemplary embodiments, based on a case in which a binding relationship is established between one wearable device and a plurality of intelligent devices, processing of step 209 may be as follows: the first wearable device receives the first verification character string and the first intelligent device identifier that are sent by the first terminal device.

In an implementation, after the first terminal device sends the first verification character string and the first intelligent device identifier to the first wearable device, the first wearable device may receive the corresponding first verification character string and first intelligent device identifier.

In some exemplary embodiments, based on the foregoing case related to the first routing device, processing of step 209 may be as follows: the first wearable device receives the first verification character string, the first intelligent device identifier, and the first routing device identifier that are sent by the first terminal device.

In some exemplary embodiments, based on the foregoing case in which first terminal device sends the operation information to the first wearable device, processing of step 209 may be as follows: the first wearable device receives the first verification character string and the operation information that are sent by the first terminal device.

In some exemplary embodiments, based on the foregoing case in which first terminal device sends the operation information to the first wearable device, after step 209, the method may include processing of performing confirmation by the user on the operation information, and the corresponding processing may be as follows: the first wearable device displays the operation information, and performs signature on the first to-be-signed information according to the locally pre-stored private key when a signature confirmation instruction input by the user is received.

In an implementation, after the first wearable device receives the operation information sent by the first terminal device, the operation information may be displayed on a screen of the first wearable device. In this way, the user may confirm a current specific operation for a control terminal on the first wearable device end. If it is confirmed that there is no error, the user may perform physical confirmation on the first wearable device side, such as click a confirmation key, swipe a fingerprint, or input designated information. Then, the first wearable device may receive the signature confirmation instruction input by the user, and then may perform signature on the first to-be-signed information according to the locally pre-stored private key.

Step 210. The first wearable device performs signature on first to-be-signed information according to a locally pre-stored private key, the first to-be-signed information including at least the first verification character string.

The signature may be a type of data processing on the first to-be-signed information. Specific processing may be: first performing summary extraction processing on the first to-be-signed information according to a preset rule, such as extracting one character every preset quantity of characters in the first to-be-signed information, and then calculating extracted summary information according to a preset algorithm, thereby obtaining first signed information.

In an implementation, after receiving the first verification character string, the first wearable device may obtain a locally pre-stored private key used for signature (for a generation process of the private key, refer to the following description), and then may perform signature on the first to-be-signed information by using the private key, the first to-be-signed information including at least the foregoing first verification character string. It should be mentioned that, to ensure security of controlling an intelligent device, it may be set herein that, signature processing is performed on the first to-be-signed information only when a signature confirmation instruction input by the user is received.

In some exemplary embodiments, based on a case in which a binding relationship is established between one wearable device and a plurality of intelligent devices, the first to-be-signed information in step 210 further includes the first intelligent device identifier, and corresponding processing may be as follows: determining a first private key corresponding to the first intelligent device identifier according to a pre-stored correspondence between an intelligent device identifier and a private key, and performing signature on the first to-be-signed information according to the first private key.

In an implementation, if the first wearable device is bound to a plurality of intelligent devices, the first intelligent device may store a correspondence between an intelligent device identifier and a private key. After receiving the first verification character string and the first intelligent device identifier, the first wearable device may first obtain the first private key corresponding to the first intelligent device identifier according to the foregoing correspondence, and then may perform signature on the first to-be-signed information by using the first private key, where the first to-be-signed information may include both the first verification character string and the first intelligent device identifier, and the first wearable device may perform signature processing on these two pieces of information by using a private key, thereby obtaining the first signed information. Herein, it may be understood that the foregoing two pieces of information may be combined into one piece of first to-be-signed information, and correspondingly one piece of first signed information may be obtained.

In some exemplary embodiments, based on the foregoing case related to the first routing device, some processing of step 210 may be as follows: determining the first private key corresponding to the first intelligent device identifier and the first routing device identifier according to a correspondence among a pre-stored intelligent device identifier, a routing device identifier, and a private key.

In an implementation, after receiving the first verification character string, the first intelligent device identifier, and the first routing device identifier, the first wearable device may determine the first private key corresponding to the first intelligent device identifier and the first routing device identifier according to the pre-stored correspondence among an intelligent device identifier, a routing device identifier, and a private key, and thereby may perform signature on the first to-be-signed information by using the first private key, where the first to-be-signed information further includes the first routing device identifier.

In some exemplary embodiments, when performing signature on to-be-signed information, a wearable device may further record a total quantity of signature times of the wearable device, and correspondingly the first to-be-signed information may further include a current total quantity of signature times of the first wearable device.

In an implementation, after receiving the first verification character string, the first wearable device may obtain a locally pre-stored private key used for signature, and meanwhile determine a current total quantity of signature times according to a historical total quantity of signature times, and then may perform signature on the first verification character string and the current total quantity of signature times by using the private key.

In some exemplary embodiments, for the foregoing processing in which the first wearable device receives the operation information, the first to-be-signed information in step 210 may further include the operation information.

Step 211. The first wearable device sends first signed information that is obtained by performing signature on the first to-be-signed information to the first terminal device.

In an implementation, after performing signature on the first to-be-signed information, the first wearable device may send the obtained first signed information to the first terminal device.

In some exemplary embodiments, based on the foregoing case related to the total quantity of signature times, corresponding processing of step 211 may be as follows: the first wearable device sends the first signed information that is obtained by performing signature on the first to-be-signed information and the current total quantity of signature times to the first terminal device.

Step 212. The first terminal device receives the first signed information that is obtained by performing signature on the first to-be-signed information and that is sent by the first wearable device.

In an implementation, after the first wearable device sends the first signed information to the first terminal device, the first terminal device may receive the corresponding first signed information.

In some exemplary embodiments, based on the foregoing case related to the total quantity of signature times, corresponding processing of step 212 may be as follows: the first terminal device receives the first signed information and the current total quantity of signature times of the first wearable device that are sent by the first wearable device, the first signed information being obtained by performing signature on the first to-be-signed information.

Step 213. The first terminal device sends, to the server, the first signed information and operation information for the first intelligent device that is input by a user.

In an implementation, after receiving the first signed information sent by the first wearable device, the first terminal device may send the first signed information to the server. Moreover, the first terminal device may further send, to the server, the operation information for the first intelligent device input by the user. Time at which the user inputs the operation information is not specifically limited herein, that is, the user may input the operation information for the first intelligent device at any moment after the first intelligent device is selected in step 201.

In some exemplary embodiments, based on the foregoing case related to the total quantity of signature times, corresponding processing of step 213 may be as follows: the first terminal device sends, to the server, the first signed information, the operation information for the first intelligent device that is input by the user, and the total quantity of signature times.

Step 214. The server receives the first signed information and the operation information for the first intelligent device that are sent by the first terminal device, the first signed information being obtained by performing signature on the first to-be-signed information, and sends the first signed information and the operation information to the first intelligent device.

In an implementation, after the first terminal device sends the first signed information and the operation information for the first intelligent device to the server, the server may receive the corresponding first signed information and operation information, and then the server may directly send the received first signed information and operation information to the first intelligent device.

In some exemplary embodiments, based on the foregoing case related to the total quantity of signature times, corresponding processing of step 214 may be as follows: the server receives the first signed information, the operation information for the first intelligent device, and the current total quantity of signature times of the first wearable device that are sent by the first terminal device, the first signed information being obtained by performing signature on the first to-be-signed information, and sends the first signed information, the operation information, and the total quantity of signature times to the first intelligent device.

Step 215. The first intelligent device receives the first signed information and the operation information that are sent by the server, the first signed information being obtained by performing signature on the first to-be-signed information, and performs signature verification on the first signed information according to a locally pre-stored public key.

The signature verification may be reverse processing of signature. That is, the first signed information is calculated according to an algorithm reverse to a signature algorithm.

For example, addition and subtraction, multiplication and division, and integration and derivation are reverse algorithms. Based on the foregoing signature processing, summary information may be obtained by performing signature verification processing on the first signed information herein.

In an implementation, after the server sends the first signed information and the operation information to the first intelligent device, the first intelligent device may receive the corresponding first signed information and operation information, and then the first intelligent device may obtain a locally pre-stored public key, and then perform signature verification on the first signed information by using the public key.

In some exemplary embodiments, based on processing of recording the first wearable device identifier in step 204 of, corresponding processing of step 215 may be as follows: the first intelligent device determines a first public key corresponding to the first wearable device identifier according to a pre-stored correspondence between a wearable device identifier and a public key, and performs signature verification on the first signed information according to the first public key.

In an implementation, if the first intelligent device is bound to a plurality of wearable devices, the first intelligent device may store a correspondence between a wearable device identifier and a public key. After receiving the first signed information, the first intelligent device may obtain the recorded first wear device identifier, and then may determine the first public key corresponding to the first wearable device identifier according to the foregoing correspondence. Then, the first intelligent device may perform signature verification on the first signed information according to the first public key.

In some exemplary embodiments, based on the foregoing case related to the total quantity of signature times, corresponding processing of step 215 may be as follows: the first intelligent device receives the first signed information, the operation information, and the current total quantity of signature times of the first wearable device that are sent by the server, the first signed information being obtained by performing signature on the first to-be-signed information, and performs, if a total quantity of signature times of the first wearable device stored in each historical signature verification process does not include the current total quantity of signature times of the first wearable device, signature verification on the first signed information according to the locally pre-stored public key.

In an implementation, each time an intelligent device performs signature verification on signed information sent by a wearable device and after the signature verification succeeds, a current total quantity of signature times of the corresponding wearable device may be stored. After the server sends the first signed information, the operation information, and the current total quantity of signature times of the first wearable device to the first intelligent device, the first intelligent device may receive the corresponding first signed information, operation information, and current total quantity of signature times of the first wearable device. Then, the first intelligent device may search, in the locally stored total quantity of signature times of the first wearable device in the historical signature verification process, for whether a current total quantity of signature times of the first wearable device exists; and if not, may obtain the locally pre-stored public key, and then perform signature verification on the first signed information by using the public key.

In some exemplary embodiments, the first intelligent device stores the current total quantity of signature times of the first wearable device if the signature verification succeeds.

In some exemplary embodiments, based on the foregoing processing of performing signature on the operation information, the first to-be-signed information in step 210 to step 215 may further include the operation information.

Step 216. The first intelligent device performs corresponding operation processing according to the operation information if the signature verification succeeds.

Based on the foregoing explanation for signature and signature verification, if summary information obtained by performing signature verification processing on the first signed information is the same as summary information obtained by performing summary extraction processing on the first to-be-signed information, it may be considered that the signature verification succeeds.

In an implementation, after the first intelligent device performs signature verification on the received first signed information, if the signature verification succeeds, the first intelligent device may perform corresponding operation processing according to the received operation information; or if the signature verification fails, the first intelligent device may discard the received operation information, and does not perform any operation processing. Additionally, the first intelligent device may further return a signature verification result to the first terminal device by using the server, and thereby the user may learn related information of the first intelligent device.

In some exemplary embodiments, both a wearable device and an intelligent device may store a key index used to indicate a public/private key, and the key index may be bound to a wearable device identifier and an intelligent device identifier. Correspondingly, in step 205, after receiving the verification request carrying the first wearable device identifier, the first intelligent device may determine a first key index according to the first wearable device identifier, and thereby may send the first key index and the first verification character string together to the server. Then, the first key index may be transferred to the first wearable device through the server and the first terminal device, and thereby the first wearable device may determine the corresponding first private key according to the first key index. Similarly, the first intelligent device may determine the corresponding first public key according to the first key index.

In some exemplary embodiments, there may further include a process of establishing a connection between the first intelligent device and the first routing device, and a corresponding processing process may be as follows:

Step 1. The first terminal device obtains a network identifier and a password that are of a local area network established by the first routing device and that are input by the user.

Step 2. The first terminal device sends the network identifier and the password to the first intelligent device.

Step 3. The first intelligent device receives and stores the network identifier and the password that are of the local area network established by the first routing device and that are sent by the first terminal device, and accesses the local area network by using the network identifier and the password.

Figure 3:
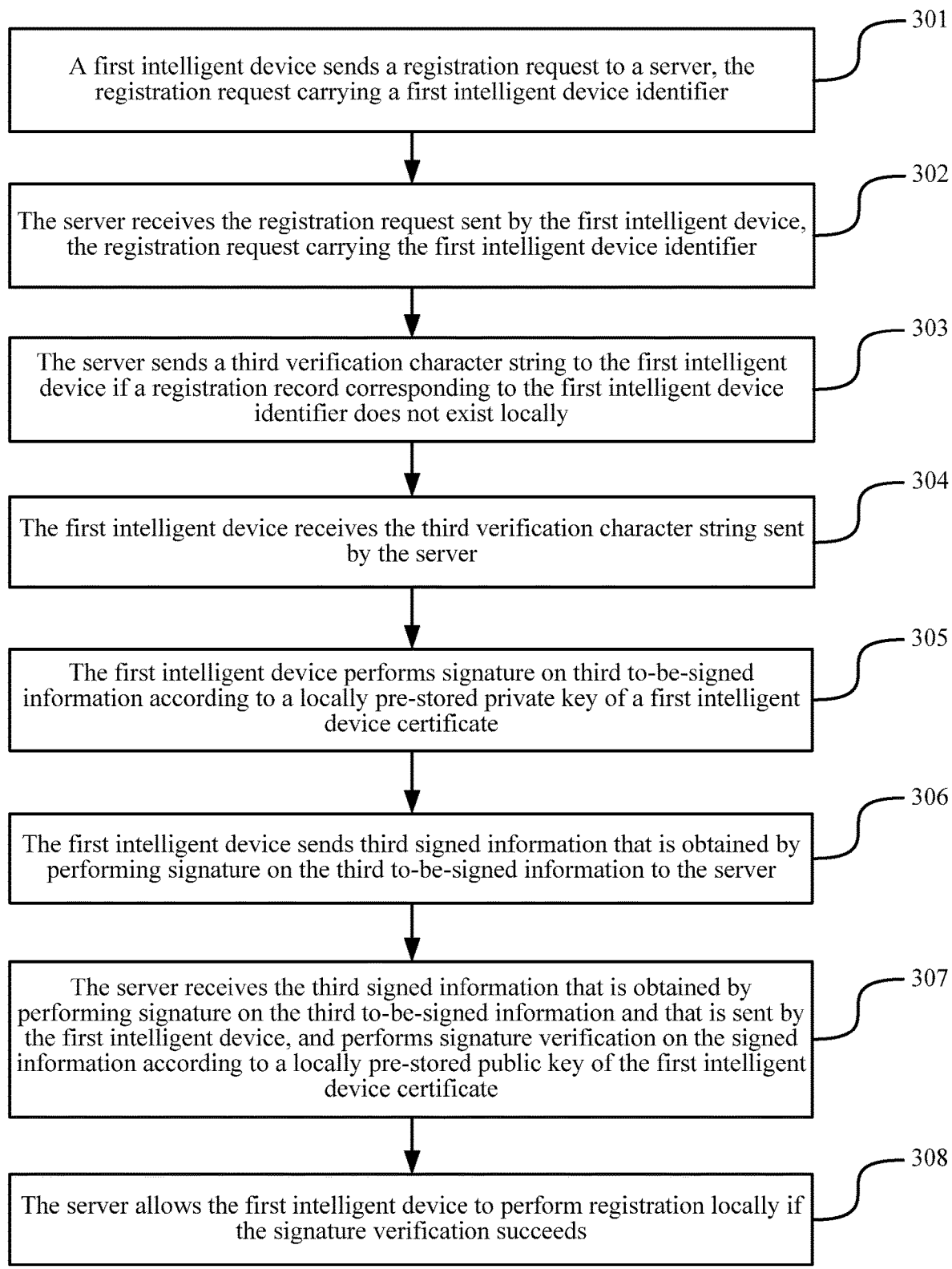
FIG. 3 is a flowchart of a method for controlling an intelligent device according to an exemplary embodiment.

In some exemplary embodiments, there may further include a process in which a first intelligent device is registered with a server, and as shown in FIG. 3, the corresponding processing process may be as follows:

Step 301. A first intelligent device sends a registration request to a server, the registration request carrying a first intelligent device identifier.

Step 302. The server receives the registration request sent by the first intelligent device, the registration request carrying the first intelligent device identifier.

Step 303. The server sends a third verification character string to the first intelligent device if a registration record corresponding to the first intelligent device identifier does not exist locally.

Step 304. The first intelligent device receives the third verification character string sent by the server.

Step 305. The first intelligent device performs signature on third to-be-signed information according to a locally pre-stored private key of a first intelligent device certificate. The third to-be-signed information may include the third verification character string.

The first intelligent device certificate may be generated by the server before the first intelligent device leaves the factory, and stored in the first intelligent device after signature is performed according to a private key of a server root certificate, and meanwhile the server may store a public key of the first intelligent device certificate and a public key of the server root certificate.

Step 306. The first intelligent device sends third signed information that is obtained by performing signature on the third to-be-signed information to the server.

In some exemplary embodiments, while sending the third signed information to the server, the first intelligent device may send the first intelligent device certificate to the server.

Step 307. The server receives the third signed information that is obtained by performing signature on the third to-be-signed information and that is sent by the first intelligent device, and performs signature verification on the signed information according to a locally pre-stored public key of the first intelligent device certificate. The third to-be-signed information may include the third verification character string.

In some exemplary embodiments, for the foregoing case in which the first intelligent device sends the first intelligent device certificate to the server, before performing signature verification on the third signed information, the server may first verify the first intelligent device certificate according to the public key of the server root certificate.

Step 308. The server allows the first intelligent device to perform registration locally if the signature verification succeeds.

Figure 4:
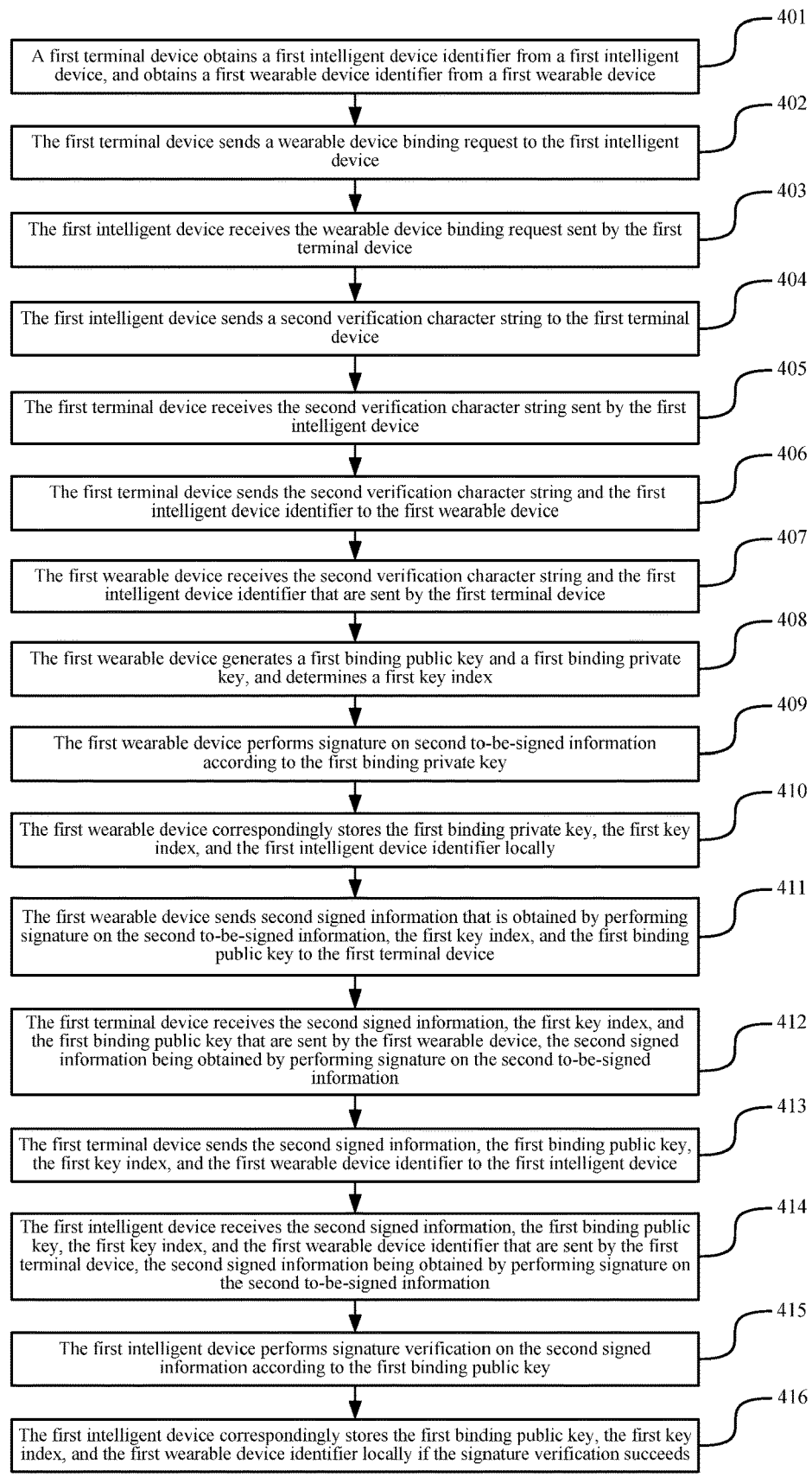
FIG. 4 is a flowchart of a method for controlling an intelligent device according to an exemplary embodiment.

In some exemplary embodiments, there may further include a process in which a first intelligent device is bound to a first wearable device, and as shown in FIG. 4, the corresponding processing process may be as follows:

Step 401. A first terminal device obtains a first intelligent device identifier from a first intelligent device, and obtains a first wearable device identifier from a first wearable device.

(A process of obtaining a related identifier in step 401 is omitted herein, and the obtaining process is not particularly limited, and therefore is omitted and not described in detail.)

Step 402. The first terminal device sends a wearable device binding request to the first intelligent device.

Step 403. The first intelligent device receives the wearable device binding request sent by the first terminal device.

Step 404. The first intelligent device sends a second verification character string to the first terminal device.

Step 405. The first terminal device receives the second verification character string sent by the first intelligent device.

Step 406. The first terminal device sends the second verification character string and the first intelligent device identifier to the first wearable device.

Step 407. The first wearable device receives the second verification character string and the first intelligent device identifier that are sent by the first terminal device.

Step 408. The first wearable device generates a first binding public key and a first binding private key, and determines a first key index.

Step 409. The first wearable device performs signature on second to-be-signed information according to the first binding private key, where the second to-be-signed information includes the second verification character string, the first intelligent device identifier, the first key index, and the first binding public key.

Step 410. The first wearable device correspondingly stores the first binding private key, the first key index, and the first intelligent device identifier locally.

Step 411. The first wearable device sends second signed information that is obtained by performing signature on the second to-be-signed information, the first key index, and the first binding public key to the first terminal device.

Step 412. The first terminal device receives the second signed information, the first key index, and the first binding public key that are sent by the first wearable device, the second signed information being obtained by performing signature on the second to-be-signed information.

Step 413. The first terminal device sends the second signed information, the first binding public key, the first key index, and the first wearable device identifier to the first intelligent device.

Step 414. The first intelligent device receives the second signed information, the first binding public key, the first key index, and the first wearable device identifier that are sent by the first terminal device, the second signed information being obtained by performing signature on the second to-be-signed information.

Step 415. The first intelligent device performs signature verification on the second signed information according to the first binding public key.

Step 416. The first intelligent device correspondingly stores the first binding public key, the first key index, and the first wearable device identifier locally if the signature verification succeeds.

To ensure device security, in the foregoing process, the first terminal device, the first wearable device, and the first intelligent device may communicate by using a short range communications component.

Figure 5:
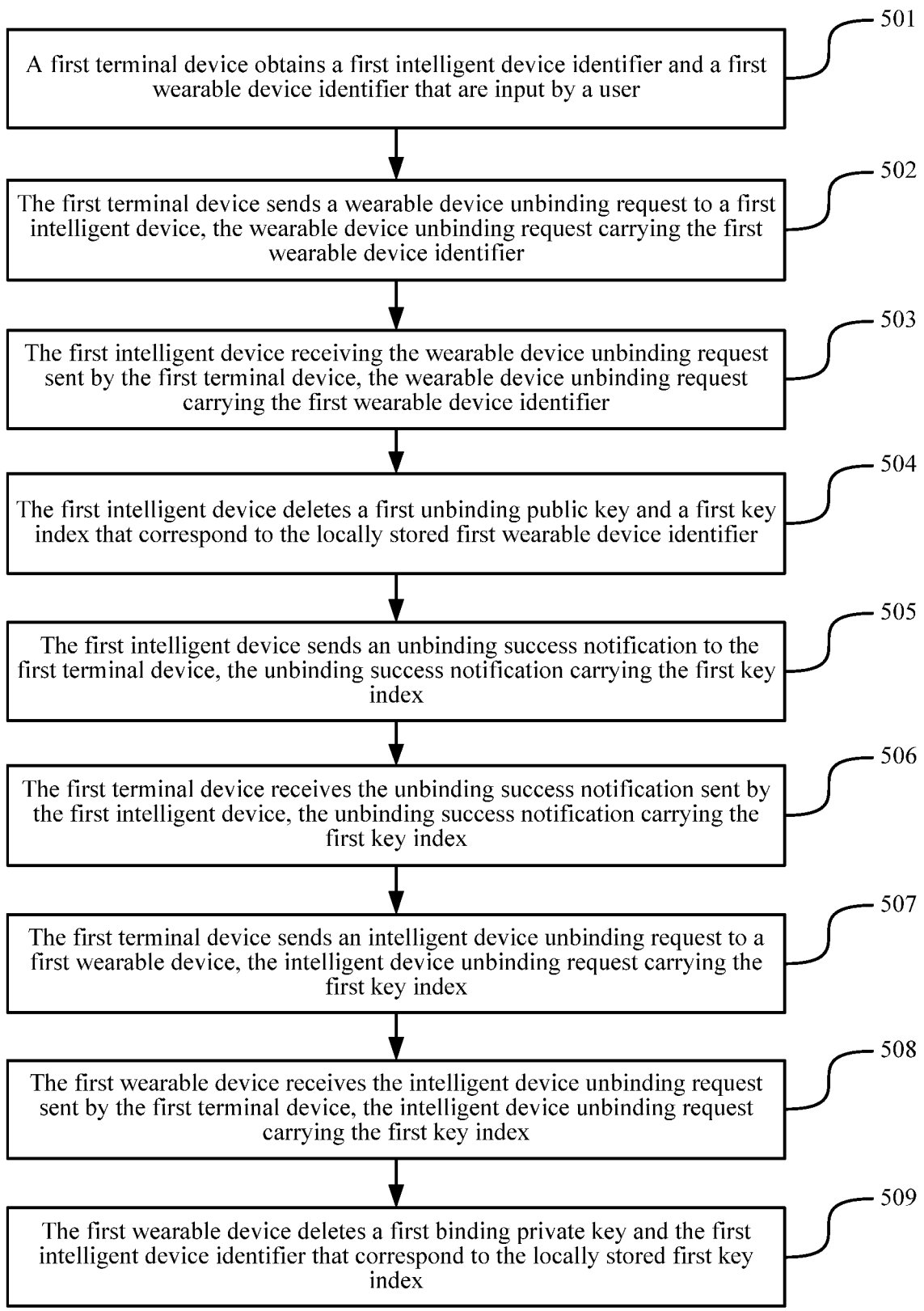
FIG. 5 is a flowchart of a method for controlling an intelligent device according to an exemplary embodiment.

In some exemplary embodiments, there may further include a process in which a first intelligent device is unbound from a first wearable device, and as shown in FIG. 5, the corresponding processing process may be as follows:

Step 501. A first terminal device obtains a first intelligent device identifier and a first wearable device identifier that are input by a user.

Step 502. The first terminal device sends a wearable device unbinding request to a first intelligent device, the wearable device unbinding request carrying the first wearable device identifier.

Step 503. The first intelligent device receiving the wearable device unbinding request sent by the first terminal device, the wearable device unbinding request carrying the first wearable device identifier.

Step 504. The first intelligent device deletes a first unbinding public key and a first key index that correspond to the locally stored first wearable device identifier.

Step 505. The first intelligent device sends an unbinding success notification to the first terminal device, the unbinding success notification carrying the first key index.

Step 506. The first terminal device receives the unbinding success notification sent by the first intelligent device, the unbinding success notification carrying the first key index.

Step 507. The first terminal device sends an intelligent device unbinding request to a first wearable device, the intelligent device unbinding request carrying the first key index.

Step 508. The first wearable device receives the intelligent device unbinding request sent by the first terminal device, the intelligent device unbinding request carrying the first key index.

Step 509. The first wearable device deletes a first binding private key and the first intelligent device identifier that correspond to the locally stored first key index.

Figure 6:
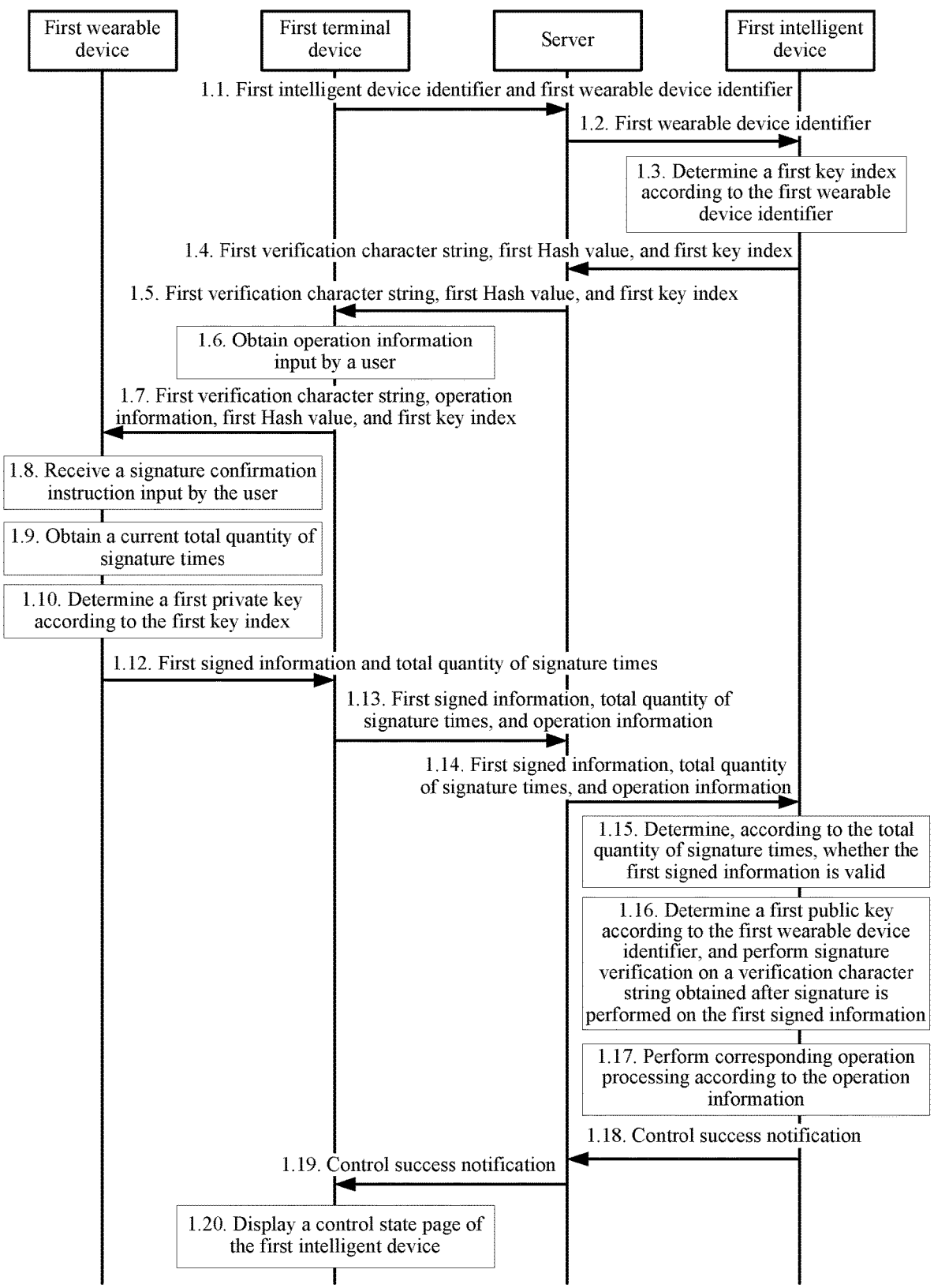
FIG. 6 is a signaling diagram of controlling an intelligent device by using a terminal device according to an exemplary embodiment.

An exemplary embodiment provides a specific process of controlling a first intelligent device by using a first terminal device, and as shown in FIG. 6, the corresponding process may be as follows:

1.1. A first terminal device sends a control request corresponding to a first intelligent device to a server, the control request carrying a first intelligent device identifier and a first wearable device identifier.

1.2. The server sends a verification request to the first intelligent device corresponding to the first intelligent device identifier, the verification request carrying the first wearable device identifier.

1.3. The first intelligent device determines, according to the first wearable device identifier, a first key index used to indicate a first public/private key.

1.4. The first intelligent device sends a first verification character string to the server, and performs Hash calculation according to a first routing device identifier and the first intelligent device identifier to obtain a first Hash value and the first key index.

1.5. The server sends the first verification character string, the first Hash value, and the first key index to the first terminal device.

1.6. The first terminal device obtains operation information input by a user.

1.7. The first terminal device sends the first verification character string, the operation information, the first Hash value, and the first key index to a first wearable device locally establishing a data connection.

1.8. The first wearable device receives a signature confirmation instruction input by the user.

1.9. The first wearable device obtains a current total quantity of signature times.

1.10. The first wearable device determines a first private key according to the first key index.

1.11. The first wearable device performs signature on first to-be-signed information according to the first private key, where the first to-be-signed information includes the first verification character string, the operation information, the first Hash value, and the total quantity of signature times.

1.12. The first wearable device sends first signed information that is obtained by performing signature on the first to-be-signed information and the total quantity of signature times to the first terminal device.

1.13. The first terminal device sends, to the server, the first signed information, the total quantity of signature times, and the operation information for the first intelligent device that is input by the user.

1.14. The server sends the first signed information, the total quantity of signature times, and the operation information to the first intelligent device.

1.15. The first intelligent device determines, according to the total quantity of signature times, whether the first signed information is valid.

1.16. The first intelligent device determines a first public key according to the first wearable device identifier, and performs signature verification on the first signed information.

1.17. The first intelligent device performs corresponding operation processing according to the operation information if the signature verification succeeds.

1.18. The first intelligent device sends a control success notification to the server.

1.19. The server sends the control success notification to the first terminal device.

1.20. The first terminal device displays a control state page of the first intelligent device.

Figure 7:
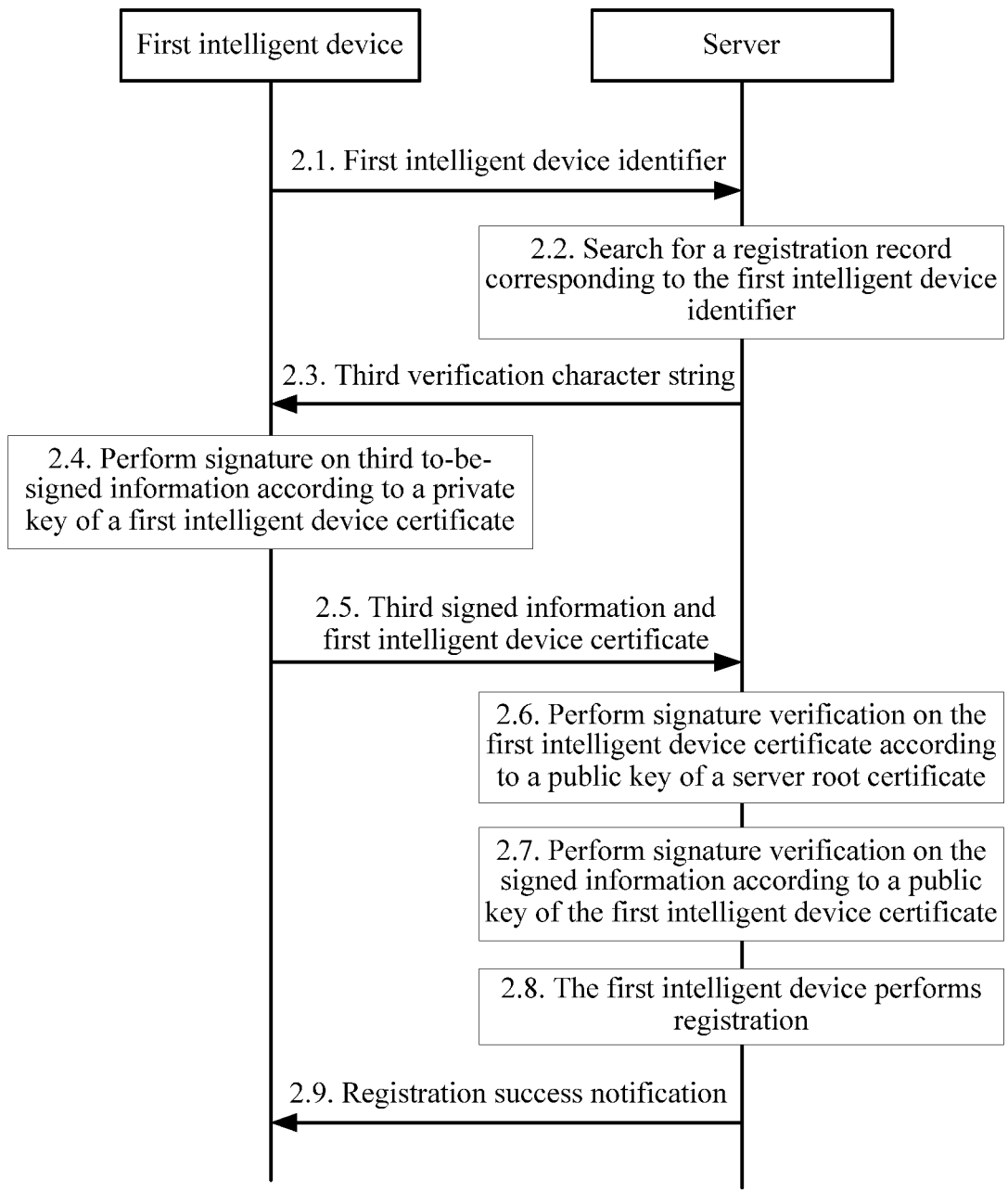
FIG. 7 is a signaling diagram of registration of an intelligent device in a server according to an exemplary embodiment.

An exemplary embodiment provides a specific process in which a first intelligent device is registered with a server, and as shown in FIG. 7, the corresponding process may be as follows:

2.1. A first intelligent device sends a registration request to a server, the registration request carrying a first intelligent device identifier.

2.2. The server searches for a registration record corresponding to the first intelligent device identifier.

2.3. The server sends a third verification character string to the first intelligent device if a registration record corresponding to the first intelligent device identifier does not exist locally.

2.4. The first intelligent device performs signature on third to-be-signed information according to a locally pre-stored private key of a first intelligent device certificate, where the third to-be-signed information includes the third verification character string.

2.5. The first intelligent device sends third signed information that is obtained by performing signature on the third to-be-signed information and the first intelligent device certificate to the server.

2.6. The server performs signature verification on the first intelligent device certificate according to a public key of a server root certificate.

2.7. The server performs signature verification on the signed information according to a public key of the first intelligent device certificate, where the third to-be-signed information includes the third verification character string.

2.8. The server allows the first intelligent device to perform registration locally if the signature verification succeeds.

2.9. The server sends a registration success notification to the first intelligent device.

Figure 8:
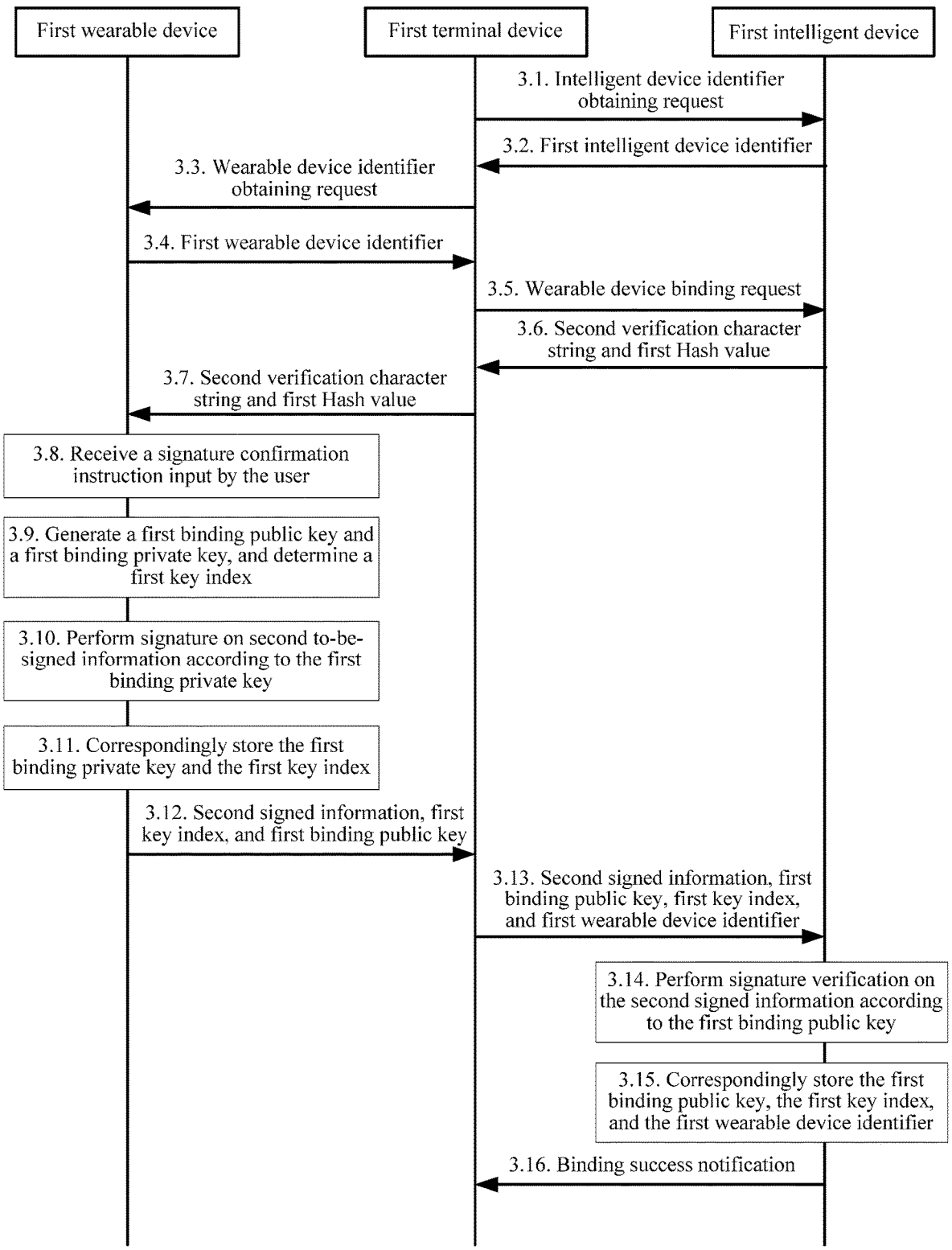
FIG. 8 is a signaling diagram of binding an intelligent device to a wearable device according to an exemplary embodiment.

An exemplary embodiment provides a specific process in which a first intelligent device is bound to a first wearable device, and as shown in FIG. 8, the corresponding process may be as follows:

3.1. A first terminal device sends an intelligent device identifier obtaining request to a first intelligent device.

3.2. The first intelligent device sends a first intelligent device identifier to the first terminal device.

3.3. The first terminal device sends a wearable device identifier obtaining request to a first wearable device.

3.4. The first wearable device sends a first wearable device identifier to the first terminal device.

3.5. The first terminal device sends a wearable device binding request to the first intelligent device.

3.6. The first intelligent device sends a second verification character string and a first Hash value to the first terminal device.

3.7. The first terminal device sends the second verification character string and the first Hash value to the first wearable device.

3.8. The first wearable device receives a signature confirmation instruction input by the user.

3.9. The first wearable device generates a first binding public key and a first binding private key, and determines a first key index.

3.10. The first wearable device performs signature on second to-be-signed information according to the first binding private key, where the second to-be-signed information includes the second verification character string, the first Hash value, the first key index, and the first binding public key.

3.11. The first wearable device correspondingly stores the first binding private key and the first key index locally.

3.12. The first wearable device sends second signed information that is obtained by performing signature on the second to-be-signed information, the first key index, and the first binding public key to the first terminal device.

3.13. The first terminal device sends the second signed information, the first binding public key, the first key index, and the first wearable device identifier to the first intelligent device.

3.14. The first intelligent device performs signature verification on the second signed information according to the first binding public key.

3.15. The first intelligent device correspondingly stores the first binding public key, the first key index, and the first wearable device identifier locally if the signature verification succeeds.

3.16. The first intelligent device sends a binding success notification to the first terminal device.

Figure 9:
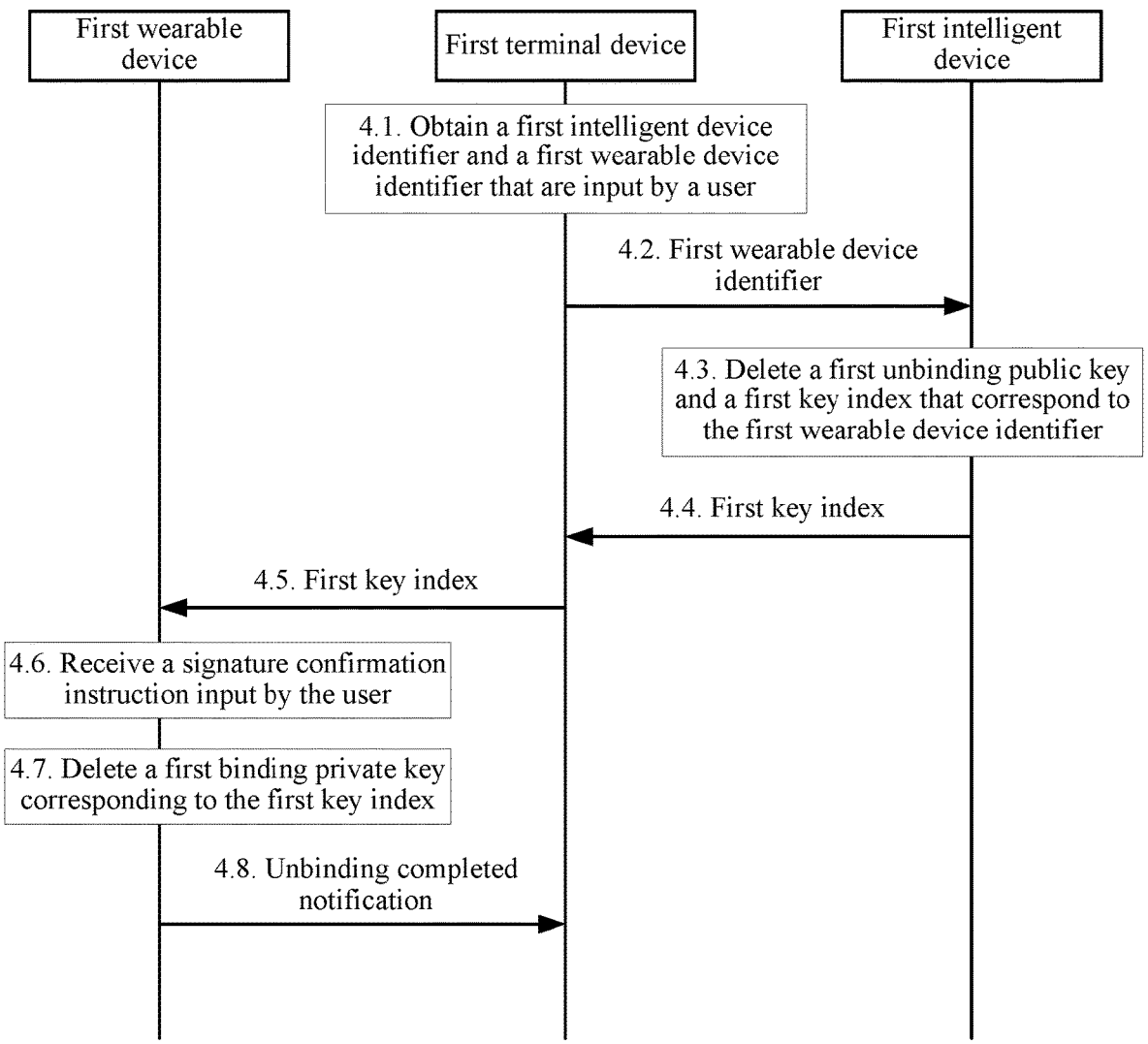
FIG. 9 is a signaling diagram of unbinding an intelligent device from a wearable device according to an exemplary embodiment.

An exemplary embodiment provides a specific process in which a first intelligent device is unbound from a first wearable device, and as shown in FIG. 9, the corresponding process may be as follows:

4.1. A first terminal device obtains a first intelligent device identifier and a first wearable device identifier that are input by a user.

4.2. The first terminal device sends a wearable device unbinding request to a first intelligent device, the wearable device unbinding request carrying the first wearable device identifier.

4.3. The first intelligent device deletes a first unbinding public key and a first key index that correspond to the locally stored first wearable device identifier.

4.4. The first intelligent device sends an unbinding success notification to the first terminal device, the unbinding success notification carrying the first key index.

4.5. The first terminal device sends an intelligent device unbinding request to a first wearable device, the intelligent device unbinding request carrying the first key index.

4.6. The first wearable device receives a signature confirmation instruction input by the user.

4.7. The first wearable device deletes a first binding private key corresponding to the locally stored first key index.

4.8. The first wearable device sends an unbinding completed notification to the first terminal device.

In this exemplary embodiment, a first terminal device sends a control request corresponding to a first intelligent device to a server, the control request carrying a first intelligent device identifier; receives a first verification character string that corresponds to the control request and that is sent by the server; sends the first verification character string to a first wearable device locally establishing a data connection; receiving first signed information that is obtained by performing signature on first to-be-signed information and that is sent by the first wearable device, the first to-be-signed information including at least the first verification character string; and sends, to the server, the first signed information and operation information for the first intelligent device that is input by a user. In a process of controlling an intelligent device, a wearable device is used to perform authorization. In this way, even if a hacker steals an administration account and a password of the intelligent device, the intelligent device cannot be controlled without the corresponding wearable device. Therefore, security of controlling the intelligent device may be enhanced.

Figure 10:
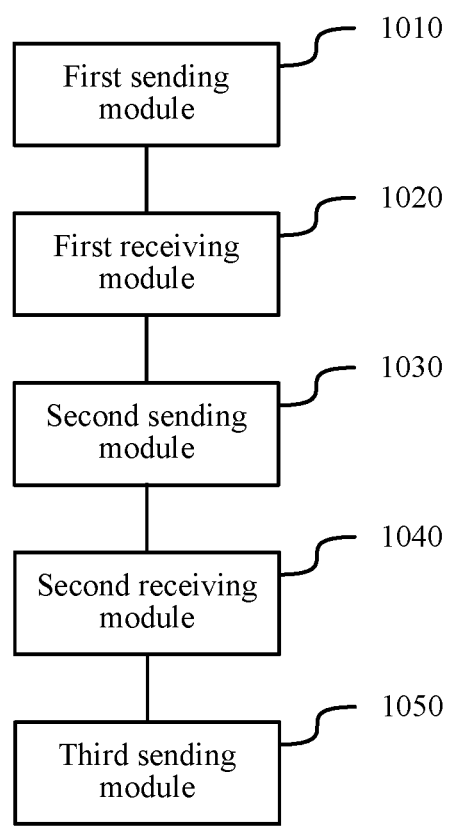
FIG. 10 is a schematic diagram of an apparatus structure of a first terminal device according to an exemplary embodiment.

An exemplary embodiment further provides a first terminal device. As shown in FIG. 10, the first terminal device includes:

a first sending module 1010, configured to send a control request corresponding to a first intelligent device to a server, the control request carrying a first intelligent device identifier;

a first receiving module 1020, configured to receive a first verification character string that corresponds to the control request and that is sent by the server;

a second sending module 1030, configured to send the first verification character string to a first wearable device locally establishing a data connection;

a second receiving module 1040, configured to receive first signed information that is obtained by performing signature on first to-be-signed information and that is sent by the first wearable device, the first to-be-signed information including at least the first verification character string; and a third sending module 1050, configured to send, to the server, the first signed information and operation information for the first intelligent device that is input by a user.

In some exemplary embodiments, the control request further carries a first wearable device identifier.

In some exemplary embodiments, the first to-be-signed information further includes the first intelligent device identifier; and the second sending module 1030 is configured to:

send the first verification character string and the first intelligent device identifier to the first wearable device locally establishing the data connection.

In some exemplary embodiments, the first to-be-signed information further includes a first routing device identifier;

the first receiving module 1020 is configured to:

receive the first verification character string corresponding to the control request and the first routing device identifier that are sent by the server, where the first routing device identifier is an identifier of a first routing device that the first intelligent device accesses; and the second sending module 1030 is configured to:

send the first verification character string, the first intelligent device identifier, and the first routing device identifier to the first wearable device locally establishing the data connection.

In some exemplary embodiments, the first to-be-signed information further includes a current total quantity of signature times of the first wearable device;

the second receiving module 1040 is configured to:

receive the first signed information and the current total quantity of signature times of the first wearable device that are sent by the first wearable device, the first signed information being obtained by performing signature on the first to-be-signed information; and the third sending module 1050 is configured to:

send, to the server, the first signed information, the operation information for the first intelligent device that is input by the user, and the total quantity of signature times.

In some exemplary embodiments, the first to-be-signed information further includes the operation information;

the first terminal device further includes:

a first obtaining module, configured to obtain the operation information for the first intelligent device that is input by the user; and the second sending module 1030 is configured to:

send the first verification character string and the operation information to the first wearable device.

In some exemplary embodiments, the first terminal device further includes:

a second obtaining module, configured to obtain the first intelligent device identifier from the first intelligent device, and obtain the first wearable device identifier from the first wearable device;

a fourth sending module, configured to send a wearable device binding request to the first intelligent device;

a third receiving module, configured to receive a second verification character string sent by the first intelligent device;

a fifth sending module, configured to send the second verification character string and the first intelligent device identifier to the first wearable device;

a fourth receiving module, configured to receive second signed information, a first key index, and a first binding public key that are sent by the first wearable device, the second signed information being obtained by performing signature on second to-be-signed information, where the second to-be-signed information includes the second verification character string, the first intelligent device identifier, the first key index, and the first binding public key; and a sixth sending module, configured to send the second signed information, the first binding public key, the first key index, and the first wearable device identifier to the first intelligent device.

In some exemplary embodiments, the first terminal device further includes:

a third obtaining module, configured to obtain the first intelligent device identifier and the first wearable device identifier that are input by the user;

a seventh sending module, configured to send a wearable device unbinding request to the first intelligent device, the wearable device unbinding request carrying the first wearable device identifier;

a fifth receiving module, configured to receive an unbinding success notification sent by the first intelligent device, the unbinding success notification carrying the first key index; and an eighth sending module, configured to send an intelligent device unbinding request to the first wearable device, the intelligent device unbinding request carrying the first key index.

Figure 11:
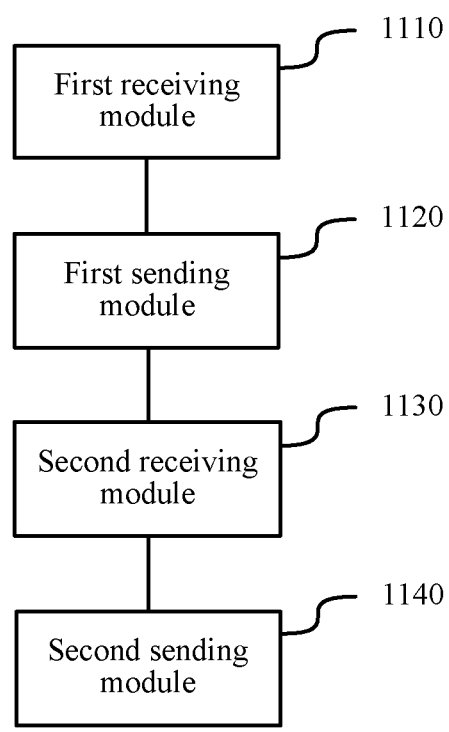
FIG. 11 is a schematic diagram of an apparatus structure of a server according to an exemplary embodiment.

An exemplary embodiment further provides a server. As shown in FIG. 11, the server includes:

a first receiving module 1110, configured to receive a control request that corresponds to a first intelligent device and that is sent by a first terminal device, the control request carrying a first intelligent device identifier;

a first sending module 1120, configured to send a verification request to the first intelligent device corresponding to the first intelligent device identifier;

a second receiving module 1130, configured to receive a first verification character string sent by the first intelligent device, and send the first verification character string to the first terminal device; and a second sending module 1140, configured to receive first signed information and operation information for the first intelligent device that are sent by the first terminal device, the first signed information being obtained by performing signature on first to-be-signed information, and send the first signed information and the operation information to the first intelligent device, the first to-be-signed information including at least the first verification character string.

In some exemplary embodiments, the control request further carries a first wearable device identifier; and the verification request further carries the first wearable device identifier.

In some exemplary embodiments, the first to-be-signed information further includes a first routing device identifier;

the second receiving module 1130 is configured to:

receive the first verification character string and the first routing device identifier that are sent by the first intelligent device, and send the first verification character string and the first routing device identifier to the first terminal device.

In some exemplary embodiments, the first to-be-signed information further includes a current total quantity of signature times of a first wearable device; and the second sending module 1140 is configured to:

receive the first signed information, the operation information for the first intelligent device, and the current total quantity of signature times of the first wearable device that are sent by the first terminal device, the first signed information being obtained by performing signature on the first to-be-signed information, and send the first signed information, the operation information, and the total quantity of signature times to the first intelligent device.

In some exemplary embodiments, the first to-be-signed information further includes the operation information.

In some exemplary embodiments, the server further includes:

a third receiving module, configured to receive a registration request sent by the first intelligent device, the registration request carrying the first intelligent device identifier;

a third sending module, configured to send a third verification character string to the first intelligent device if a registration record corresponding to the first intelligent device identifier does not exist locally;

a signature verification module, configured to receive third signed information that is obtained by performing signature on third to-be-signed information and that is sent by the first intelligent device, and perform signature verification on the signed information according to a locally pre-stored public key of a first intelligent device certificate, where the third to-be-signed information includes the third verification character string; and a registration module, configured to allow the first intelligent device to perform registration locally if the signature verification succeeds.

Figure 12:
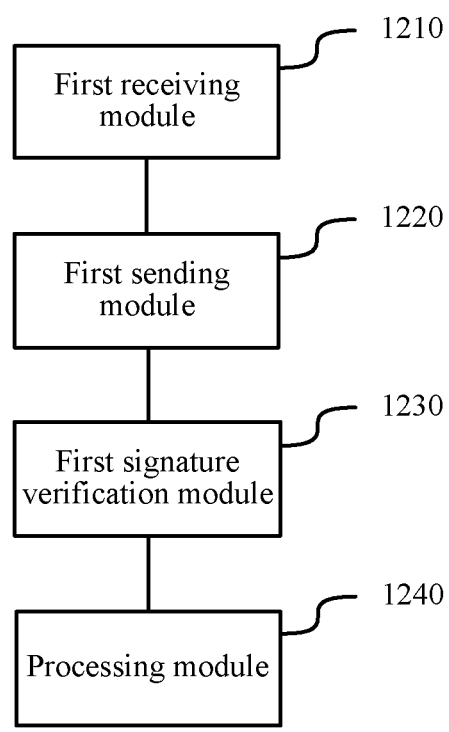
FIG. 12 is a schematic diagram of an apparatus structure of a first intelligent device according to an exemplary embodiment.

An exemplary embodiment further provides a first intelligent device. As shown in FIG. 12, the first intelligent device includes:

a first receiving module 1210, configured to receive a verification request sent by a server;

a first sending module 1220, configured to send a first verification character string to the server;

a first signature verification module 1230, configured to receive first signed information and operation information that are sent by the server, the first signed information being obtained by performing signature on first to-be-signed information, and perform signature verification on the first signed information according to a locally pre-stored public key, the first to-be-signed information including at least the first verification character string; and a processing module 1240, configured to perform corresponding operation processing according to the operation information if the signature verification succeeds.

In some exemplary embodiments, the verification request further carries the first wearable device identifier; and the first signature verification module 1230 is configured to:

determine a first public key corresponding to the first wearable device identifier according to a pre-stored correspondence between a wearable device identifier and a public key, and perform signature verification on the first signed information according to the first public key.

In some exemplary embodiments, the first sending module 1220 is configured to:

send, to the server, the first verification character string and a first routing device identifier of a first routing device locally establishing a communication connection.

In some exemplary embodiments, the first to-be-signed information further includes a current total quantity of signature times of a first wearable device;

the first signature verification module 1230 is configured to:

receive the first signed information, the operation information, and the current total quantity of signature times of the first wearable device that are sent by the server, the first signed information being obtained by performing signature on the first to-be-signed information, and perform, if a total quantity of signature times of the first wearable device stored in each historical signature verification process does not include the current total quantity of signature times of the first wearable device, signature verification on the first signed information according to the locally pre-stored public key; and the first intelligent device further includes: a first storage module, configured to store the current total quantity of signature times of the first wearable device if the signature verification succeeds.

In some exemplary embodiments, the first to-be-signed information further includes the operation information.

In some exemplary embodiments, the first intelligent device further includes:

a second sending module, configured to send a registration request to the server, the registration request carrying a first intelligent device identifier;

a second receiving module, configured to receive a third verification character string sent by the server;

a signature module, configured to perform signature on third to-be-signed information according to a locally pre-stored private key of a first intelligent device certificate, where the third to-be-signed information includes the third verification character string; and a third sending module, configured to send third signed information that is obtained by performing signature on the third to-be-signed information to the server.

In some exemplary embodiments, the first intelligent device further includes:

a third receiving module, configured to receive a wearable device binding request sent by the first terminal device;

a fourth sending module, configured to send a second verification character string to the first terminal device;

a fourth receiving module, configured to receive second signed information, a first binding public key, a first key index, and a first wearable device identifier that are sent by the first terminal device, the second signed information being obtained by performing signature on second to-be-signed information, where the second to-be-signed information includes the second verification character string, the first intelligent device identifier, the first key index, and the first binding public key;

a second signature verification module, configured to perform signature verification on the second signed information according to the first binding public key; and a second storage module, configured to correspondingly store the first binding public key, the first key index, and the first wearable device identifier locally if the signature verification succeeds.

In some exemplary embodiments, the first intelligent device further includes:

a fifth receiving module, configured to receive a wearable device unbinding request sent by the first terminal device, the wearable device unbinding request carrying the first wearable device identifier;

a deletion module, configured to delete a first unbinding public key and the first key index that correspond to the locally stored first wearable device identifier; and a fifth sending module, configured to send an unbinding success notification to the first terminal device, the unbinding success notification carrying the first key index.

Figure 13:
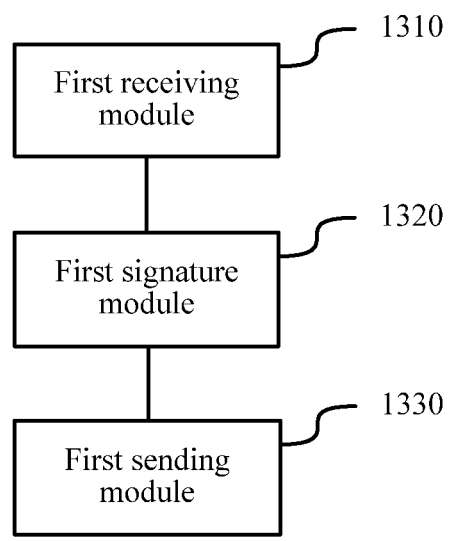
FIG. 13 is a schematic diagram of an apparatus structure of a first wearable device according to an exemplary embodiment.

An exemplary embodiment further provides a first wearable device. As shown in FIG. 13, the first wearable device includes:

a first receiving module 1310, configured to receive a first verification character string sent by a first terminal device;

a first signature module 1320, configured to perform signature on first to-be-signed information according to a locally pre-stored private key, the first to-be-signed information including at least the first verification character string; and a first sending module 1330, configured to send first signed information that is obtained by performing signature on the first to-be-signed information to the first terminal device.

In some exemplary embodiments, the first to-be-signed information further includes the first intelligent device identifier;

the first receiving module 1310 is configured to:

receive the first verification character string and the first intelligent device identifier that are sent by the first terminal device; and the first signature module 1320 is configured to:

determine a first private key corresponding to the first intelligent device identifier according to a pre-stored correspondence between an intelligent device identifier and a private key, and performing signature on the first to-be-signed information according to the first private key.

In some exemplary embodiments, the first to-be-signed information further includes a first routing device identifier;

the first receiving module 1310 is configured to:

receive the first verification character string, the first intelligent device identifier, and the first routing device identifier that are sent by the first terminal device; and the first signature module 1320 is configured to:

determine the first private key corresponding to the first intelligent device identifier and the first routing device identifier according to a correspondence among a pre-stored intelligent device identifier, a routing device identifier, and a private key.

In some exemplary embodiments, the first to-be-signed information further includes a current total quantity of signature times of the first wearable device; and the first sending module 1330 is configured to:

send first signed information that is obtained by performing signature on the first to-be-signed information, and the current total quantity of signature times to the first terminal device.

In some exemplary embodiments, the first to-be-signed information further includes the operation information, and the first receiving module 1310 is configured to:

receive the first verification character string and the operation information that are sent by the first terminal device.

In some exemplary embodiments, the first wearable device further includes:

a display module, configured to display the operation information; and the first signature module 1320 is configured to:

perform signature on the first to-be-signed information according to the locally pre-stored private key when a signature confirmation instruction input by a user is received.

In some exemplary embodiments, the first wearable device further includes:

a second receiving module, configured to receive a second verification character string and a first intelligent device identifier that are sent by the first terminal device;

a determining module, configured to generate a first binding public key and a first binding private key, and determine a first key index;

a second signature module, configured to perform signature on second to-be-signed information according to the first binding private key, where the second to-be-signed information includes the second verification character string, the first intelligent device identifier, the first key index, and the first binding public key;

a storage module, configured to correspondingly store the first binding private key, the first key index, and the first intelligent device identifier locally; and a second sending module, configured to send second signed information that is obtained by performing signature on the second to-be-signed information, the first key index, and the first binding public key to the first terminal device.

In some exemplary embodiments, the first wearable device further includes:

a third receiving module, configured to receive an intelligent device unbinding request sent by the first terminal device, the intelligent device unbinding request carrying the first key index; and a deletion module, configured to delete the first binding private key and the first intelligent device identifier that correspond to the locally stored first key index.

An exemplary embodiment further provides a system for controlling an intelligent device, including: a first terminal device, a server, a first intelligent device, and a first wearable device, the first terminal device being configured to send a control request corresponding to the first intelligent device to the server, the control request carrying a first intelligent device identifier; receive a first verification character string that corresponds to the control request and that is sent by the server; send the first verification character string to the first wearable device locally establishing a data connection; receive first signed information that is obtained by performing signature on first to-be-signed information and that is sent by the first wearable device, the first to-be-signed information including at least the first verification character string; and send, to the server, the first signed information and operation information for the first intelligent device that is input by a user;

the server being configured to receive the control request that corresponds to the first intelligent device and that is sent by the first terminal device; send a verification request to the first intelligent device corresponding to the first intelligent device identifier; receive the first verification character string sent by the first intelligent device, and send the first verification character string to the first terminal device; and receive the first signed information and the operation information for the first intelligent device that are sent by the first terminal device, the first signed information being obtained by performing signature on the first to-be-signed information, and send the first signed information and the operation information to the first intelligent device;

the first intelligent device being configured to receive the verification request sent by the server; send the first verification character string to the server; receive the first signed information and the operation information that are sent by the server, the first signed information being obtained by performing signature on the first to-be-signed information, and perform signature verification on the first signed information according to a locally pre-stored public key; and perform corresponding operation processing according to the operation information if the signature verification succeeds; and the first wearable device is configured to receive the first verification character string sent by the first terminal device; perform signature on the first to-be-signed information according to a locally pre-stored private key; and send the first signed information that is obtained by performing signature on the first to-be-signed information to the first terminal device.

In this exemplary embodiment, a first terminal device sends a control request corresponding to a first intelligent device to a server, the control request carrying a first intelligent device identifier; receives a first verification character string that corresponds to the control request and that is sent by the server; sends the first verification character string to a first wearable device locally establishing a data connection; receiving first signed information that is obtained by performing signature on first to-be-signed information and that is sent by the first wearable device, the first to-be-signed information including at least the first verification character string; and sends, to the server, the first signed information and operation information for the first intelligent device that is input by a user. In a process of controlling an intelligent device, a wearable device is used to perform authorization. In this way, even if a hacker steals an administration account and a password of the intelligent device, the intelligent device cannot be controlled without the corresponding wearable device. Therefore, security of controlling the intelligent device may be enhanced.

It should be noted that division of the foregoing functional modules is only described for exemplary purposes when the apparatus for controlling an intelligent device provided in the forgoing exemplary embodiments controls an intelligent device. In an actual application, the foregoing functions may be allocated to be accomplished by different functional modules according to requirements. That is, the internal structure of the apparatus may be divided into different functional modules, to accomplish all or some functions of the above described functions. In addition, an inventive concept of the apparatus for controlling an intelligent device provided in the forgoing exemplary embodiments is the same as that of the exemplary embodiments of the method for controlling an intelligent device. For a specific implementation process, refer to the method exemplary embodiments for details, and details are not described herein again.

Figure 14:
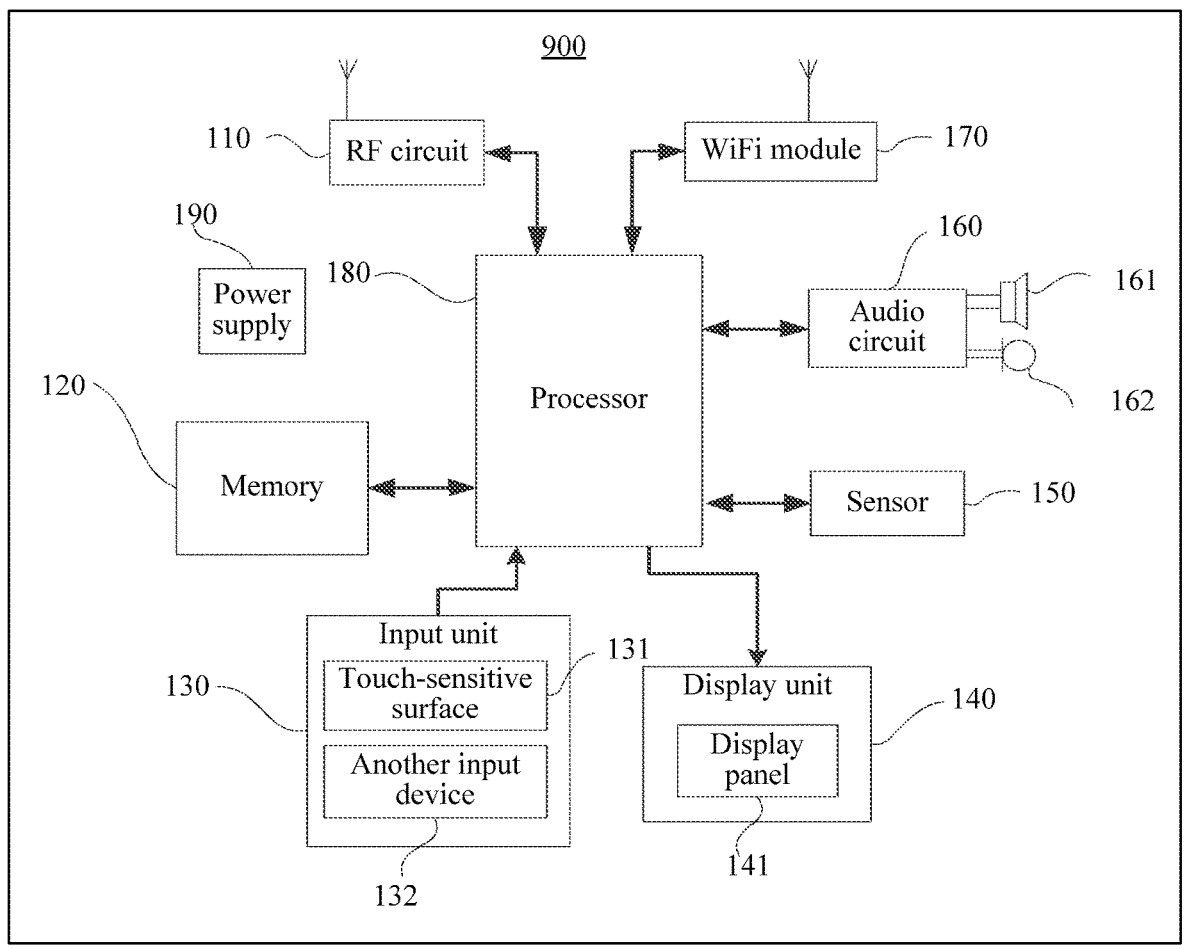
FIG. 14 is a schematic structural diagram of a first terminal device according to an exemplary embodiment.

Referring to FIG. 14, FIG. 14 is a schematic structural diagram of a first terminal device involved in an exemplary embodiment. The first terminal device may be configured to implement the method for controlling an intelligent device provided in the forgoing exemplary embodiments.

The first terminal device 900 may include components such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power supply 190. A person skilled in the art will understand that the structure of the first terminal device shown in FIG. 14 does not constitute a limitation to the first terminal device, and the first terminal device may include more components or fewer components than those shown in the figure, or some components may be combined, or a different component deployment may be used.

The RF circuit 110 may be configured to receive and send signals during information receiving and sending or during a call. Particularly, the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by means of wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the first terminal device 900, and the like. In addition, the memory 120 may include a high speed random access memory, and may also include a non-volatile memory such as at least one magnetic disk storage device, a flash memory, or another volatile solid-state storage device. Accordingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. In some exemplary embodiments, the input unit 130 may include a touch-sensitive surface 131 and another input device 132. The touch-sensitive surface 131 may also be referred to as a touch display screen or a touch panel, and may collect a touch operation of a user on or near the touch-sensitive surface (such as an operation of a user on or near the touch-sensitive surface 131 by using any suitable object or attachment, such as a finger or a touch pen), and drive a corresponding connection apparatus according to a preset program. In some exemplary embodiments, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 180. Moreover, the touch controller can receive and execute a command sent by the processor 180. In addition, the touch-sensitive surface 131 may be implemented by using various types, such as a resistive type, a capacitive type, an infrared type, and a surface acoustic wave type. In addition to the touch-sensitive surface 131, the input unit 130 may further include the another input device 132. In some exemplary embodiments, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the first terminal device 900. The graphical user interfaces may be formed by a graph, a text, an icon, a video, and any combination thereof. The display unit 140 may include a display panel 141. In some exemplary embodiments, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, to determine the type of the touch event. Then, the processor 180 provides a corresponding visual output on the display panel 141 according to the type of the touch event. Although, in FIG. 14, the touch-sensitive surface 131 and the display panel 141 are used as two separate parts to implement input and output functions, in some embodiments, the touch-sensitive surface 131 and the display panel 141 may be integrated to implement the input and output functions.

The first terminal device 900 may further include at least one sensor 150, such as an optical sensor, a motion sensor, and other sensors. In some exemplary embodiments, the optical sensor may include an ambient light sensor and a proximity sensor. The ambient light sensor may adjust luminance of the display panel 141 according to brightness of the ambient light. The proximity sensor may switch off the display panel 141 and/or backlight when the first terminal device 900 is moved to the ear. As one type of motion sensor, a gravity acceleration sensor may detect magnitude of accelerations in various directions (which generally are triaxial), may detect magnitude and a direction of the gravity when static, and may be used for an application that recognizes the attitude of the mobile phone (for example, switching between landscape orientation and portrait orientation, a related game, and magnetometer attitude calibration), and a function related to vibration recognition (such as a pedometer and a knock). Other sensors, such as a gyroscope, a barometer, a hygrometer, a thermometer, and an infrared sensor, which may be configured in the first terminal device 900 are not further described herein.

The audio circuit 160, a speaker 161, and a microphone 162 may provide audio interfaces between the user and the first terminal device 900. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another first terminal device by using the RF circuit 110, or outputs the audio data to the memory 120 for further processing. The audio circuit 160 may further include an earphone jack, so as to provide communication between a peripheral earphone and the first terminal device 900.

The WiFi is based on a short distance wireless transmission technology. The first terminal device 900 may help, by using the WiFi module 170, the user to receive and send e-mails, browse a web page, access streaming media, and so on, which provides wireless broadband Internet access for the user. Although FIG. 14 shows the WiFi circuit 170, it may be understood that the WiFi circuit 170 is not a necessary component of the first terminal device 900, and when required, the WiFi circuit 170 may be omitted as long as the scope of the essence of the present disclosure is not changed.

The processor 180 is a control center of the first terminal device 900, which is connected to various parts of the entire mobile phone by using various interfaces and lines, and by running or executing a software program and/or module stored in the memory 120 and calling data stored in the memory 120, to perform various functions of the first terminal device 900 and process data, so as to perform overall monitoring on the mobile phone. In some exemplary embodiments, the processor 180 may include one or more processor cores. The processor 180 may integrate an application processor and a modem processor. The application processor mainly processes an operating system, a user interface, an application program, and the like. The modem processor mainly processes wireless communication. It may be understood that the foregoing modem processor may be not integrated into the processor 180.

The first terminal device 900 further includes the power supply 190 (such as a battery) for supplying power to the components. The power supply may logically connect to the processor 180 by using a power supply management system, thereby implementing functions, such as charging, discharging, and power consumption management, by using the power supply management system. The power supply 190 may further include one or more of a direct current or alternating current power supply, a re-charging system, a power failure detection circuit, a power supply converter or inverter, a power supply state indicator, and any other component.

Although not shown in the figure, the first terminal device 900 may further include a camera, a Bluetooth module, and the like, which are not further described herein. Specifically, in this exemplary embodiment, the display unit of the first terminal device 900 is a touchscreen display, and the first terminal device 900 further includes a memory and one or more programs. The one or more programs are stored in the memory and executed by one or more processors. The one or more programs include instructions used to perform the following operations:

sending a control request corresponding to a first intelligent device to a server, the control request carrying a first intelligent device identifier;

receiving a first verification character string that corresponds to the control request and that is sent by the server;

sending the first verification character string to a first wearable device locally establishing a data connection;

receiving first signed information that is obtained by performing signature on first to-be-signed information and that is sent by the first wearable device, the first to-be-signed information including at least the first verification character string; and sending, to the server, the first signed information and operation information for the first intelligent device that is input by a user.

In some exemplary embodiments, the control request further carries a first wearable device identifier.

In some exemplary embodiments, the first to-be-signed information further includes the first intelligent device identifier; and the sending the first verification character string to a first wearable device locally establishing a data connection includes:

sending the first verification character string and the first intelligent device identifier to the first wearable device locally establishing the data connection.

In some exemplary embodiments, the first to-be-signed information further includes a first routing device identifier;

the receiving a first verification character string that corresponds to the control request and that is sent by the server includes:

receiving the first verification character string corresponding to the control request and the first routing device identifier that are sent by the server, where the first routing device identifier is an identifier of a first routing device that the first intelligent device accesses; and the sending the first verification character string and the first intelligent device identifier to the first wearable device locally establishing the data connection includes:

sending the first verification character string, the first intelligent device identifier, and the first routing device identifier to the first wearable device locally establishing the data connection.

In some exemplary embodiments, the first to-be-signed information further includes a current total quantity of signature times of the first wearable device;

the receiving first signed information that is obtained by performing signature on first to-be-signed information and that is sent by the first wearable device includes:

receiving the first signed information and the current total quantity of signature times of the first wearable device that are sent by the first wearable device, the first signed information being obtained by performing signature on the first to-be-signed information; and the sending, to the server, the first signed information and operation information for the first intelligent device that is input by a user includes:

sending, to the server, the first signed information, the operation information for the first intelligent device that is input by the user, and the total quantity of signature times.

In some exemplary embodiments, the first to-be-signed information further includes the operation information;

before the sending the first verification character string to a first wearable device, the method further includes:

obtaining the operation information for the first intelligent device that is input by the user; and the sending the first verification character string to a first wearable device includes:

sending the first verification character string and the operation information to the first wearable device.

In some exemplary embodiments, the method further includes:

obtaining the first intelligent device identifier from the first intelligent device, and obtaining the first wearable device identifier from the first wearable device;

sending a wearable device binding request to the first intelligent device;

receiving a second verification character string sent by the first intelligent device;

sending the second verification character string and the first intelligent device identifier to the first wearable device;

receiving second signed information, a first key index, and a first binding public key that are sent by the first wearable device, the second signed information being obtained by performing signature on second to-be-signed information, where the second to-be-signed information includes the second verification character string, the first intelligent device identifier, the first key index, and the first binding public key; and sending the second signed information, the first binding public key, the first key index, and the first wearable device identifier to the first intelligent device.

In some exemplary embodiments, the method further includes:

obtaining the first intelligent device identifier and the first wearable device identifier that are input by the user;

sending a wearable device unbinding request to the first intelligent device, the wearable device unbinding request carrying the first wearable device identifier;

receiving an unbinding success notification sent by the first intelligent device, the unbinding success notification carrying the first key index; and sending an intelligent device unbinding request to the first wearable device, the intelligent device unbinding request carrying the first key index.

In this exemplary embodiment, a first terminal device sends a control request corresponding to a first intelligent device to a server, the control request carrying a first intelligent device identifier; receives a first verification character string that corresponds to the control request and that is sent by the server; sends the first verification character string to a first wearable device locally establishing a data connection; receives first signed information that is obtained by performing signature on first to-be-signed information and that is sent by the first wearable device, the first to-be-signed information including at least the first verification character string; and sends, to the server, the first signed information and operation information for the first intelligent device that is input by a user. In a process of controlling an intelligent device, a wearable device is used to perform authorization. In this way, even if a hacker steals an administration account and a password of the intelligent device, the intelligent device cannot be controlled without the corresponding wearable device. Therefore, security of controlling the intelligent device may be enhanced.

Figure 15:
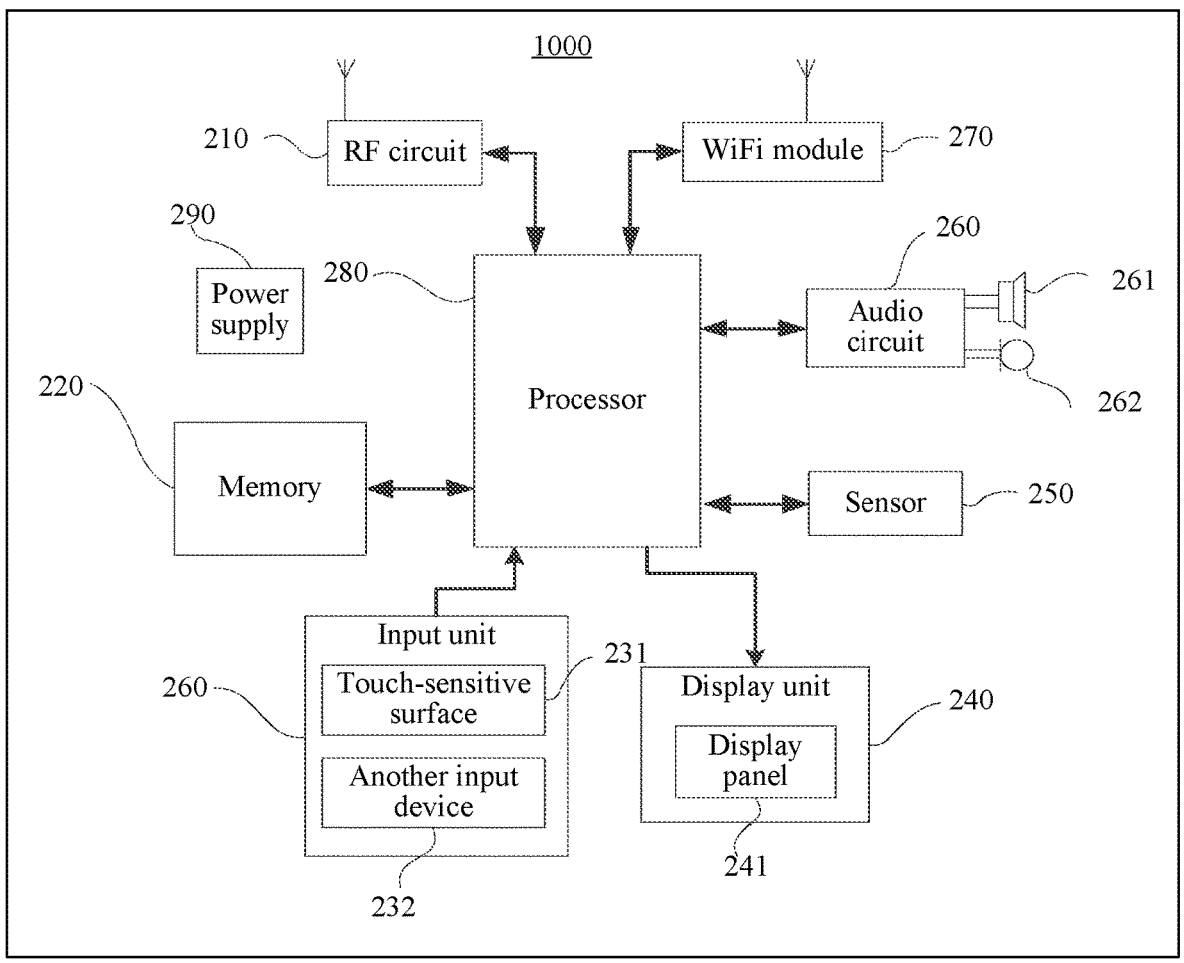
FIG. 15 is a schematic structural diagram of a first intelligent device according to an exemplary embodiment.

Referring to FIG. 15, FIG. 15 is a schematic structural diagram of a first intelligent device involved in an exemplary embodiment. The first intelligent device may be configured to implement the method for controlling an intelligent device provided in the forgoing exemplary embodiment.

The first intelligent device 1000 may include components such as a radio frequency (RF) circuit 210, a memory 220 including one or more computer readable storage media, an input unit 230, a display unit 240, a sensor 250, an audio circuit 260, a wireless fidelity (WiFi) module 270, a processor 280 including one or more processing cores, and a power supply 290. A person skilled in the art may understand that the structure of the first intelligent device shown in FIG. 15 does not constitute a limitation to the first intelligent device, and the first intelligent device may include more components or fewer components than those shown in the figure, or some components may be combined, or a different component deployment may be used.

The RF circuit 210 may be configured to receive and send signals during information receiving and sending, and deliver the received information to one or more processors 280 for processing. Generally, the RF circuit 210 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 210 may also communicate with a network and another device by means of wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 220 may be configured to store a software program and module. The processor 280 runs the software program and module stored in the memory 220, to implement various functional applications and data processing. The memory 220 may mainly include a program storage area and a data storage area. The program storage area may store an operating system, an application program required by at least one function (such as a sound playback function and an image display function), and the like. The data storage area may store data (such as audio data and an address book) created according to use of the first intelligent device 1000, and the like. In addition, the memory 220 may include a high speed random access memory, and may also include a non-volatile memory such as at least one magnetic disk storage device, a flash memory, or another volatile solid-state storage device. Accordingly, the memory 220 may further include a memory controller, so that the processor 280 and the input unit 230 access the memory 220.

The input unit 230 may be configured to receive input digit or character information. In some exemplary embodiments, the input unit 230 may include a touch-sensitive surface 231 and another input device 232. The touch-sensitive surface 231 may also be referred to as a touch display screen or a touch panel, and may collect a touch operation of a user on or near the touch-sensitive surface (such as an operation of a user on or near the touch-sensitive surface 231 by using any suitable object or attachment, such as a finger or a touch pen), and drive a corresponding connection apparatus according to a preset program. In some exemplary embodiments, the touch-sensitive surface 231 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 280. Moreover, the touch controller can receive and execute a command sent by the processor 280. In addition, the touch-sensitive surface 231 may be implemented by using various types, such as a resistive type, a capacitive type, an infrared type, and a surface acoustic wave type. In addition to the touch-sensitive surface 231, the input unit 230 may further include the another input device 232. In some exemplary embodiments, the another input device 232 may include, but is not limited to, one or more of a physical keyboard, a functional key (such as a volume control key or a switch key).

The display unit 240 may be configured to display information input by the user or information provided for the user, and various graphical user interfaces of the first intelligent device 1000. The graphical user interfaces may be formed by a graph, a text, an icon, a video, and any combination thereof. The display unit 240 may include a display panel 241. In some exemplary embodiments, the display panel 241 may be configured by using a liquid crystal display (LCD), an organic light-emitting diode (OLED), or the like. Further, the touch-sensitive surface 231 may cover the display panel 241. After detecting a touch operation on or near the touch-sensitive surface 231, the touch-sensitive surface 231 transfers the touch operation to the processor 280, to determine the type of the touch event. Then, the processor 280 provides a corresponding visual output on the display panel 241 according to the type of the touch event. Although, in FIG. 15, the touch-sensitive surface 231 and the display panel 241 are used as two separate parts to implement input and output functions, in some embodiments, the touch-sensitive surface 231 and the display panel 241 may be integrated to implement the input and output functions.

The first intelligent device 1000 may further include at least one sensor 250, such as an optical sensor, a motion sensor, and other sensors. In some exemplary embodiments, the optical sensor may include an ambient light sensor and a proximity sensor. The ambient light sensor may adjust luminance of the display panel 241 according to brightness of the ambient light. The proximity sensor may switch off the display panel 241 and/or backlight when the first intelligent device 1000 is moved to the ear. Other sensors, such as a barometer, a hygrometer, a thermometer, and an infrared sensor, which may be configured in the first intelligent device 1000 are not further described herein.

The audio circuit 260, a speaker 261, and a microphone 262 may provide audio interfaces between the user and the first intelligent device 1000. The audio circuit 260 may convert received audio data into an electric signal and transmit the electric signal to the speaker 261. The speaker 261 converts the electric signal into a sound signal for output. On the other hand, the microphone 262 converts a collected sound signal into an electric signal. The audio circuit 260 receives the electric signal and converts the electric signal into audio data, and outputs the audio data to the processor 280 for processing. Then, the processor 280 sends the audio data to, for example, another device by using the RF circuit 210, or outputs the audio data to the memory 220 for further processing. The audio circuit 260 may further include an earphone jack, so as to provide communication between a peripheral earphone and the first intelligent device 1000.

The WiFi is based on a short distance wireless transmission technology. The first intelligent device 1000 may help, by using the WiFi module 270, the user to receive and send e-mails, browse a web page, access streaming media, and so on, which provides wireless broadband Internet access for the user. Although FIG. 15 shows the WiFi circuit 270, it may be understood that the WiFi circuit 270 is not a necessary component of the first intelligent device 1000, and when required, the WiFi circuit 270 may be omitted as long as the scope of the essence of the present disclosure is not changed.

The processor 280 is a control center of the first intelligent device 1000, which is connected to various parts of the entire mobile phone by using various interfaces and lines, and by running or executing a software program and/or module stored in the memory 220 and calling data stored in the memory 220, to perform various functions of the first intelligent device 1000 and process data, so as to perform overall monitoring on the mobile phone. In some exemplary embodiments, the processor 280 may include one or more processor cores. The processor 280 may integrate an application processor and a modem processor. The application processor mainly processes an operating system, a user interface, an application program, and the like. The modem processor mainly processes wireless communication. It may be understood that the foregoing modem processor may be not integrated into the processor 280.

The first intelligent device 1000 further includes the power supply 290 (such as a battery) for supplying power to the components. The power supply may logically connect to the processor 280 by using a power supply management system, thereby implementing functions, such as charging, discharging, and power consumption management, by using the power supply management system. The power supply 290 may further include one or more of a direct current or alternating current power supply, a re-charging system, a power failure detection circuit, a power supply converter or inverter, a power supply state indicator, and any other component.

Although not shown in the figure, the first intelligent device 1000 may further include a Bluetooth module, and the like, which are not further described herein. Specifically, in this exemplary embodiment, the display unit of the first intelligent device 1000 is a touchscreen display, and the first intelligent device 1000 further includes a memory and one or more programs. The one or more programs are stored in the memory and executed by one or more processors. The one or more programs include instructions used to perform the following operations:

receiving a verification request sent by a server;

sending a first verification character string to the server;

receiving first signed information and operation information that are sent by the server, the first signed information being obtained by performing signature on first to-be-signed information, and performing signature verification on the first signed information according to a locally pre-stored public key, the first to-be-signed information including at least the first verification character string; and performing corresponding operation processing according to the operation information if the signature verification succeeds.

In some exemplary embodiments, the verification request further carries the first wearable device identifier; and the performing signature verification on the first signed information according to a locally pre-stored public key includes:

determining a first public key corresponding to the first wearable device identifier according to a pre-stored correspondence between a wearable device identifier and a public key, and performing signature verification on the first signed information according to the first public key.

In some exemplary embodiments, the sending a first verification character string to the server includes:

sending, to the server, the first verification character string and a first routing device identifier of a first routing device locally establishing a communication connection.

In some exemplary embodiments, the first to-be-signed information further includes a current total quantity of signature times of a first wearable device;

the receiving first signed information and operation information that are sent by the server, the first signed information being obtained by performing signature on first to-be-signed information, and performing signature verification on the first signed information according to a locally pre-stored public key includes:

receiving the first signed information, the operation information, and the current total quantity of signature times of the first wearable device that are sent by the server, the first signed information being obtained by performing signature on the first to-be-signed information, and performing, if a total quantity of signature times of the first wearable device stored in each historical signature verification process does not include the current total quantity of signature times of the first wearable device, signature verification on the first signed information according to the locally pre-stored public key; and the method further includes: storing the current total quantity of signature times of the first wearable device if the signature verification succeeds.

In some exemplary embodiments, the first to-be-signed information further includes the operation information.

In some exemplary embodiments, the method further includes:

sending a registration request to the server, the registration request carrying a first intelligent device identifier;

receiving a third verification character string sent by the server;

performing signature on third to-be-signed information according to a locally pre-stored private key of a first intelligent device certificate, where the third to-be-signed information includes the third verification character string; and sending third signed information that is obtained by performing signature on the third to-be-signed information to the server.

In some exemplary embodiments, the method further includes:

receiving a wearable device binding request sent by the first terminal device;

sending a second verification character string to the first terminal device;

receiving second signed information, a first binding public key, a first key index, and a first wearable device identifier that are sent by the first terminal device, the second signed information being obtained by performing signature on second to-be-signed information, where the second to-be-signed information includes the second verification character string, the first intelligent device identifier, the first key index, and the first binding public key;

performing signature verification on the second signed information according to the first binding public key; and correspondingly storing the first binding public key, the first key index, and the first wearable device identifier locally if the signature verification succeeds.

In some exemplary embodiments, the method further includes:

receiving a wearable device unbinding request sent by the first terminal device, the wearable device unbinding request carrying the first wearable device identifier;

deleting a first unbinding public key and the first key index that correspond to the locally stored first wearable device identifier; and sending an unbinding success notification to the first terminal device, the unbinding success notification carrying the first key index.

In this exemplary embodiment, a first terminal device sends a control request corresponding to a first intelligent device to a server, the control request carrying a first intelligent device identifier; receives a first verification character string that corresponds to the control request and that is sent by the server; sends the first verification character string to a first wearable device locally establishing a data connection; receives first signed information that is obtained by performing signature on first to-be-signed information and that is sent by the first wearable device, the first to-be-signed information including at least the first verification character string; and sends, to the server, the first signed information and operation information for the first intelligent device that is input by a user. In a process of controlling an intelligent device, a wearable device is used to perform authorization. In this way, even if a hacker steals an administration account and a password of the intelligent device, the intelligent device cannot be controlled without the corresponding wearable device. Therefore, security of controlling the intelligent device may be enhanced.

An exemplary embodiment provides a computer storage medium, the computer storage medium stores computer executable instructions, and the computer executable instructions are configured to perform at least one of the methods for controlling an intelligent device, specifically such as at least one of the methods shown in FIG. 1 to FIG. 9. The storage medium may be a random storage medium, a read only storage medium, a flash memory, or the like, and is in some exemplary embodiments a non-transient storage medium.

A person of ordinary skill in the technology will understand that all or some of the steps of the forgoing exemplary embodiments may be implemented by using hardware, or may be implemented by a program instructing relevant hardware. The program may be stored in a computer readable storage medium. The storage medium may be a read-only memory, a magnetic disk, an optical disc, or the like.

The forgoing exemplary embodiments are merely exemplary embodiments, and are not for limiting the present disclosure. It should be understood that any modification made within the spirit and specifications of the present disclosure and according to the principle of the present disclosure shall fall within the protection scope of the present disclosure and the attached claims.

What is claimed is:

1. A device comprising:

at least one memory configured to store computer program code; and at least one processor configured to access the at least one memory and operate according to the computer program code, the computer program code including:

first sending code configured to cause the at least one processor to transmit a first intelligent device identifier;

first receiving code configured to cause the at least one processor to receive, in response to transmitting the first intelligent device identifier, a first character string;

second sending code configured to cause the at least one processor to transmit the first character string to a first wearable device establishing a connection with the first wearable device;

second receiving code configured to cause the at least one processor to receive, from the first wearable device, first signed information comprising the first character string, the first signed information being a result of performing a signature on first to-be-signed information; and third sending code configured to cause the at least one processor to transmit, to a first intelligent device, the first signed information and operation information for controlling the first intelligent device, fourth sending code configured to cause the at least one processor to transmit a binding request to the first intelligent device;

third receiving code configured to cause the at least one processor to receive a second character string from the first intelligent device;

fifth sending code configured to cause the at least one processor to transmit the second character string and the first intelligent device identifier to the first wearable device;

fourth receiving code configured to cause the at least one processor to receive second signed information, a first key index, and a first binding public key from the first wearable device, the second signed information being a result of performing signature on second to-be-signed information, wherein the second to-be-signed information comprises the second character string, the first intelligent device identifier, the first key index, and the first binding public key; and sixth sending code configured to cause the at least one processor to transmit the second signed information, the first binding public key, the first key index, and a first wearable device identifier to the first intelligent device, wherein the first to-be-signed information further comprises the first intelligent device identifier; and the second sending code is configured to cause the at least one processor to:

transmit the first intelligent device identifier to the first wearable device establishing the connection with the first wearable device.

2. The device according to claim 1, wherein the first sending code is further configured to cause the at least one processor to transmit the first wearable device identifier corresponding to the first wearable device.

3. The device according to claim 1, wherein the first to-be-signed information further comprises a first routing device identifier of a first routing device that the first intelligent device accesses;

the first receiving code is configured to cause the at least one processor to:

receive the first character string corresponding to the first routing device identifier; and the second sending code is configured to cause the at least one processor to:

transmit the first character string, the first intelligent device identifier, and the first routing device identifier to the first wearable device establishing the connection with the first wearable device.

4. The device according to claim 1, wherein the first to-be-signed information further comprises a signature quantity that corresponds to a current total quantity of signature times of the first wearable device;

the second receiving code is configured to cause the at least one processor to:

receive the first signed information and the signature quantity from the first wearable device; and the third sending code is configured to cause the at least one processor to:

transmit the first signed information, the operation information, and the signature quantity.

5. The device according to claim 1, wherein the first to-be-signed information further comprises the operation information;

the computer program code further comprises:

obtaining code configured to cause the at least one processor to obtain the operation information for the first intelligent device from a user; and the second sending code is configured to cause the at least one processor to:

transmit the first character string and the operation information to the first wearable device.

6. The device according to claim 1, wherein the computer program code further comprises:

obtaining code configured to cause the at least one processor to obtain the first intelligent device identifier and the first wearable device identifier from a user;

seventh sending code configured to cause the at least one processor to transmit an unbinding request to the first intelligent device, the unbinding request comprising the first wearable device identifier;

fifth receiving code configured to cause the at least one processor to receive a notification from the first intelligent device, the notification comprising the first key index; and eighth sending code configured to cause the at least one processor to transmit an unbinding request comprising the first key index, to the first wearable device.

7. A device comprising:

at least one memory configured to store computer program code; and at least one processor configured to access the at least one memory and operate according to the computer program code, the computer program code including:

first receiving code configured to cause the at least one processor to receive a first character string from a first terminal device;

first signature code configured to cause the at least one processor to perform a signature on first to-be-signed information according to a pre-stored private key to generate first signed information, the first to-be-signed information comprising at least the first character string; and first sending code configured to cause the at least one processor to transmit the first signed information to the first terminal device, second receiving code configured to cause the at least one processor to receive a second character string and a first intelligent device identifier from the first terminal device;

determining code configured to cause the at least one processor to generate a first binding public key and a first binding private key, and determine a first key index;

second signature code configured to cause the at least one processor to perform a signature on second to-be-signed information according to the first binding private key, wherein the second to-be-signed information comprises the second character string, the first intelligent device identifier, the first key index, and the first binding public key;

storage code configured to cause the at least one processor to store the first binding private key, the first key index, and the first intelligent device identifier; and second sending code configured to cause the at least one processor to transmit, to the first terminal device, second signed information that is a result of performing the signature on the second to-be-signed information, the first key index, and the first binding public key, wherein the first to-be-signed information further comprises the first intelligent device identifier corresponding to a first intelligent device;

the first receiving code is configured to cause the at least one processor to:

receive the first character string and the first intelligent device identifier from the first terminal device; and the first signature code is configured to cause the at least one processor to:

determine a first private key corresponding to the first intelligent device identifier according to a pre-stored correspondence between an intelligent device identifier and a private key, and perform the signature on the first to-be-signed information according to the first private key.

8. The device according to claim 7, wherein the first to-be-signed information further comprises a first routing device identifier of a first routing device that the first intelligent device accesses;

the first receiving code is configured to cause the at least one processor to:

receive the first character string, the first intelligent device identifier, and the first routing device identifier from the first terminal device; and the first signature code is configured to cause the at least one processor to:

determine the first private key corresponding to the first intelligent device identifier and the first routing device identifier according to a correspondence among a pre-stored intelligent device identifier, a routing device identifier, and the private key.

9. The device according to claim 7, wherein the first to-be-signed information further comprises operation information, and the first receiving code is configured to cause the at least one processor to:

receive the first character string and the operation information from the first terminal device.

10. The device according to claim 9, further comprising:

display code configured to cause the at least one processor to display the operation information; and the first signature code is configured to cause the at least one processor to:

perform signature on the first to-be-signed information according to the pre-stored private key in response to a signature confirmation instruction.

11. The device according to claim 7, wherein the computer program code further comprises:

third receiving code configured to cause the at least one processor to receive an unbinding request comprising the first key index, from the first terminal device; and deletion code configured to cause the at least one processor to delete the first binding private key and the first intelligent device identifier that correspond to the first key index.

12. A system comprising: a first terminal device, a server, a first intelligent device, and a first wearable device, the first terminal device comprising at least one first memory configured to store first computer program code, and at least one first processor configured to access the at least one first memory and operate according to the first computer program code to:

transmit to the server a first intelligent device identifier;

receive a first character string from the server;

transmit the first character string to the first wearable device establishing a connection with the first wearable device;

receive first signed information that is a result of performing a signature on first to-be-signed information from the first wearable device, the first to-be-signed information comprising at least the first character string; and transmit, to the server, the first signed information and operation information for controlling the first intelligent device;

the server comprising at least one second memory configured to store second computer program code, and at least one second processor configured to access the at least one second memory and operate according to the second computer program code to:

receive the first intelligent device identifier from the first terminal device, transmit a request to the first intelligent device corresponding to the first intelligent device identifier, receive the first character string from the first intelligent device, and transmit the first character string to the first terminal device, and receive the first signed information and the operation information for the first intelligent device from the first terminal device, the first signed information being obtained by performing the signature on the first to-be-signed information, and transmit the first signed information and the operation information to the first intelligent device;

the first intelligent device comprising at least one third memory configured to store third computer program code, and at least one third processor configured to access the at least one third memory and operate according to the third computer program code to:

receive the request from the server, send the first character string to the server, receive the first signed information and the operation information from the server, the first signed information being obtained by performing the signature on the first to-be-signed information, perform signature verification on the first signed information according to a pre-stored public key, and
perform corresponding operation processing according to the operation information if the signature verification succeeds; and the first wearable device comprising at least one fourth memory configured to store fourth computer program code, and at least one fourth processor configured to access the at least one fourth memory and operate according to the fourth computer program code to:
receive the first character string from the first terminal device,
perform the signature on the first to-be-signed information according to a pre-stored private key to generate the first signed information, and
transmit the first signed information to the first terminal device,
wherein the at least one first processor of the first terminal device accesses the at least one first memory and operates according to the first computer program code to further:
transmit a wearable device binding request to the first intelligent device;
receive a second character string from the first intelligent device;
transmit the second character string and the first intelligent device identifier to the first wearable device;
receive second signed information, a first key index, and a first binding public key from the first wearable device, the second signed information being a result of performing signature on second to-be-signed information, wherein the second to-be-signed information comprises the second character string, the first intelligent device identifier, the first key index, and the first binding public key; and
transmit the second signed information, the first binding public key, the first key index, and a first wearable device identifier to the first intelligent device,
wherein the first to-be-signed information further comprises the first intelligent device identifier; and
the first terminal device is further configured to transmit the first intelligent device identifier to the first wearable device establishing the connection with the first wearable device.

13. The device according to claim 1, wherein the device and the first wearable device are connected to a same local area network.

14. The device according to claim 1, wherein the first wearable device is a smart band, a smart pen, or a Bluetooth headset.

15. The device according to claim 1, wherein the first intelligent device is an intelligent refrigerator, an intelligent television, an intelligent microwave, or an intelligent oven.

16. The device according to claim 1, wherein the device is a mobile terminal.

17. The device according to claim 7, wherein:
the device is a smart band, a smart pen, or a Bluetooth headset,
the first intelligent device is an intelligent refrigerator, an intelligent television, an intelligent microwave, or an intelligent oven, and
the first terminal device is a mobile terminal.

18. The system according to claim 12, wherein:
the first wearable device is a smart band, a smart pen, or a Bluetooth headset,
the first intelligent device is an intelligent refrigerator, an intelligent television, an intelligent microwave, or an intelligent oven, and
the first terminal device is a mobile terminal.

* * * * *